United States Patent
Chen et al.

(10) Patent No.: US 10,263,741 B2
(45) Date of Patent: Apr. 16, 2019

(54) COORDINATED MULTIPOINT (COMP) AND NETWORK ASSISTED INTERFERENCE SUPPRESSION/CANCELLATION

(71) Applicant: QUALCOMM Incorporated, San Diego, CA (US)

(72) Inventors: Wanshi Chen, San Diego, CA (US); Tao Luo, San Diego, CA (US); Stefan Geirhofer, Brooklyn, NY (US); Peter Gaal, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 260 days.

(21) Appl. No.: 14/273,049

(22) Filed: May 8, 2014

(65) Prior Publication Data
US 2014/0334402 A1 Nov. 13, 2014

Related U.S. Application Data

(60) Provisional application No. 61/822,249, filed on May 10, 2013.

(51) Int. Cl.
*H04B 7/06* (2006.01)
*H04L 5/00* (2006.01)
(Continued)

(52) U.S. Cl.
CPC ........... *H04L 5/0035* (2013.01); *H04B 7/024* (2013.01); *H04W 72/12* (2013.01); *H04B 7/0617* (2013.01);
(Continued)

(58) Field of Classification Search
CPC ..... H04L 5/001; H04L 5/0035; H04L 5/0048; H04L 5/0073; H04B 7/024; H04B 7/0617;
(Continued)

(56) References Cited

U.S. PATENT DOCUMENTS 8,923,207 B2 * 12/2014 Ho .................. H04L 5/0048
370/328
9,544,112 B2 * 1/2017 Park .................. H04L 5/0048
(Continued)

FOREIGN PATENT DOCUMENTS

CN 101772038 A 7/2010
CN 102647789 A 8/2012
(Continued)

OTHER PUBLICATIONS

"3GPP TSG RAN WG1 Meeting #72 Agenda item 3 Title: Draft Report of 3GPP TSG RAN WG1 #71 v0.1.0", Nov. 21, 2012 (Nov. 21, 2012), pp. 1-97, XP055133372, 3rd Generation Partnership Project (3GPP) Mobile Competence Centre; 650, route des Lucioles; F-06921 Sophia-Antipolis Cedex, France Retrieved from the Internet: URL: http://www.3gpp.org/ftp/tsg_ran/WG1_RL1/TSGR1_71/Report/Draft_ReportWG1 %2371_v010.zip [retrieved on Aug. 5, 2014].
(Continued)

*Primary Examiner* — Asad M Nawaz
*Assistant Examiner* — Kai Chang
(74) *Attorney, Agent, or Firm* — Liem T. Do

(57) ABSTRACT

A method of wireless communications identifies a first virtual cell identity. The method also includes determining one or more virtual cells based on the identified first virtual cell identity. The method further includes processing one channel based on the determination.

20 Claims, 22 Drawing Sheets

(51) Int. Cl.
*H04B 7/024* (2017.01)
*H04W 72/12* (2009.01)

(52) U.S. Cl.
CPC .......... *H04B 7/0619* (2013.01); *H04B 7/0621* (2013.01); *H04B 7/0626* (2013.01); *H04L 5/001* (2013.01); *H04L 5/0048* (2013.01); *H04L 5/0073* (2013.01)

(58) Field of Classification Search
CPC .. H04B 7/0619; H04B 7/0621; H04B 7/0626; H04W 72/12
See application file for complete search history.

(56) References Cited

U.S. PATENT DOCUMENTS

| | | | |
|---|---|---|---|
| 9,755,800 B2* | 9/2017 | Kim | H04L 5/0048 |
| 9,854,570 B2* | 12/2017 | Luo | H04W 72/042 |
| 2004/0127223 A1* | 7/2004 | Li | H04B 7/022 |
| | | | 455/446 |
| 2007/0183544 A1 | 8/2007 | Lee et al. | |
| 2010/0285810 A1 | 11/2010 | Ko et al. | |
| 2011/0090861 A1 | 4/2011 | Kim et al. | |
| 2011/0244900 A1* | 10/2011 | Noh | H04W 24/10 |
| | | | 455/501 |
| 2013/0003788 A1* | 1/2013 | Marinier | H04B 7/024 |
| | | | 375/219 |
| 2013/0195025 A1* | 8/2013 | Chatterjee | H04L 5/0035 |
| | | | 370/329 |
| 2014/0056243 A1* | 2/2014 | Pelletier | H04W 74/04 |
| | | | 370/329 |
| 2014/0086176 A1* | 3/2014 | Liu | H04W 74/006 |
| | | | 370/329 |
| 2014/0092829 A1* | 4/2014 | Han | H04L 5/0053 |
| | | | 370/329 |
| 2014/0128115 A1* | 5/2014 | Siomina | H04L 1/0015 |
| | | | 455/501 |
| 2014/0204853 A1* | 7/2014 | Ko | H04L 5/0073 |
| | | | 370/329 |
| 2014/0219202 A1* | 8/2014 | Kim | H04L 1/1861 |
| | | | 370/329 |
| 2014/0233466 A1* | 8/2014 | Pourahmadi | H04L 27/2613 |
| | | | 370/329 |
| 2014/0233519 A1* | 8/2014 | Nagata | H04L 5/0057 |
| | | | 370/329 |
| 2014/0302863 A1* | 10/2014 | Chen | H04W 24/02 |
| | | | 455/452.1 |
| 2014/0314000 A1* | 10/2014 | Liu | H04W 72/042 |
| | | | 370/329 |
| 2015/0181572 A1* | 6/2015 | Guo | H04L 5/0048 |
| | | | 370/312 |
| 2015/0195817 A1* | 7/2015 | Sathananthan | H04W 72/042 |
| | | | 370/329 |
| 2015/0208392 A1* | 7/2015 | Park | H04B 7/024 |
| | | | 370/329 |
| 2015/0223208 A1* | 8/2015 | Park | H04L 5/001 |
| | | | 370/329 |
| 2015/0237624 A1* | 8/2015 | Tang | H04W 72/0446 |
| | | | 370/329 |
| 2015/0257130 A1* | 9/2015 | Lee | H04W 72/042 |
| | | | 370/336 |
| 2015/0304997 A1* | 10/2015 | Park | H04B 7/024 |
| | | | 370/330 |
| 2015/0365154 A1* | 12/2015 | Davydov | H04B 7/024 |
| | | | 370/329 |
| 2015/0373626 A1* | 12/2015 | Yi | H04W 48/20 |
| | | | 375/132 |
| 2015/0382371 A1* | 12/2015 | Liu | H04B 7/024 |
| | | | 370/329 |
| 2016/0013903 A1* | 1/2016 | Kim | H04J 11/005 |
| | | | 370/329 |
| 2016/0073394 A1* | 3/2016 | Kim | H04J 11/0053 |
| | | | 370/329 |
| 2016/0087709 A1* | 3/2016 | Horiuchi | H04B 7/068 |
| | | | 375/260 |

FOREIGN PATENT DOCUMENTS

| | | |
|---|---|---|
| JP | 2010073468 A | 4/2010 |
| WO | 2008093619 A1 | 8/2008 |
| WO | 2012108945 A2 | 8/2012 |

OTHER PUBLICATIONS

Bendin R., et al., "Embracing LTE-A with KeyStone SoCs", Oct. 1, 2012 (Oct. 1, 2012), 15 Pages, XP055079421, Retrieved from the Internet: URL: http://www.ti.com/lit/wp/spry218/spry218.pdf [retrieved on Sep. 16, 2013].
International Search Report and Written Opinion—PCT/US2014/037543—ISA/EPO—dated Dec. 3, 2014.
Catt: "Further Details of DCI Format 2D [online]", 3GPP Draft; R1-124759, 3rd Generation Partnership Project (3GPP), 3GPP TSG-RAN WG1 Meeting; #71, New Orleans, USA, Nov. 16, 2012, 2 pages.
Intel Corporation: "Interference Models for LTE NAICS Link-Level Simulations", 3GPP Draft, R4-131320, 3rd Generation Partnership Project (3GPP), 3GPP TSG-RAN WG4 Meeting; #66bis, Chicago, USA, Apr. 19, 2013, pp. 1-4.
LG Electronics: "Remaining Aspects of PUCCH Resource Allocation", 3GPP Draft; R1-123532, 3rd Generation Partnership Project (3GPP), 3GPP TSG-RAN WG1 Meeting; #70, Qingdao, China, Aug. 17, 2012, pp. 1-5.
LG Electronics: "Remaining Issues for Uplink RSs", 3GPP Draft; R1-123937, 3rd Generation Partnership Project (3GPP), 3GPP TSG-RAN WG1 Meeting; #70, Qingdao, China, Aug. 17, 2012, pp. 1-3.
Nokia: "On Scenarios for Network-Assisted Interference Cancellation and Suppression for LTE", 3GPP Draft; R1-131252, 3rd Generation Partnership Project (3GPP), 3GPP TSG-RAN WG1 Meeting; #72bis, Chicago, USA, Apr. 19, 2013, 5 pages.
Panasonic: "Potential Standardization Impact of Uplink CoMP", 3GPP TSG-RAN WG1#66b, R1-113126, Oct. 4, 2011, pp. 1-2, URL: http://www.3gpp.org/ftp/tsg_ran/WG1_RL1/TSGR1_66b/Docs/R1-113126.zip.
3GPP TS 36.300, V11.4.0, Dec. 2012, Jan. 3, 2013, URL: http://www.3gpp.org/ftp/Specs/archive/36_series/36.300/36300-b70.zip , pp. 122-124.
3GPP TS 36.213 v11.2.0 (Feb. 2013), 3rd Generation Partnership Project; Technical Specification Group Radio Access Network; Evolved Universal Terrestrial Radio Access (E-UTRA); Physical layer procedures (Release 11), 173 pp.
Huawei, HiSilicon, "On the Support of TM10 with CA in Rel-11", 3GPP TSG RAN WG1 Meeting #72bis R1-131154, 3 pages, Apr. 2013, URL: http://www.3gpp.org/ftp/tsg_ran/WG1_RL1/TSGR1_72b/Docs/R1-131154.zip.
NTT Docomo, "Downlink Control Signaling for Rel.11 CoMP," 3GPP TSG RAN WG1 Meeting #71, R1-125314, 6 pages, Dec. 15, 2012, URL: http://www.3gpp.org/ftp/TSG_RAN/WG_RL1/TSGR1_71/Docs/R1-125314.zip.
Qualcomm Incorporated, "System Level Simulations for Demod Requirements," 3GPP TSG-RAN WG4#65, R4-126127, 2012, 4 pages, URL: http://www.3gpp.org/ftp/tsg_ran/WG4_Radio/TSGR4_65/Docs/R4-126127.zip.

* cited by examiner

| PQI VALUE | VC1 | VC2 | VC3 | VC4 |
|---|---|---|---|---|
| 00 | PARAMETER SET 1 | PARAMETER SET 2 | PARAMETER SET 3 | PARAMETER SET 4 |
| 01 | PARAMETERS OF PQI 00 | PARAMETERS OF PQI 10 | PARAMETERS OF PQI 11 | PARAMETER SET 5 |
| 10 | PARAMETERS OF PQI 00 | PARAMETERS OF PQI 10 | PARAMETERS OF PQI 11 | PARAMETERS OF PQI 11 |
| 11 | PARAMETERS OF PQI 00 | PARAMETERS OF PQI 01 | PARAMETERS SET 5 | EMPTY |

COORDINATED MULTIPOINT (COMP) AND NETWORK ASSISTED INTERFERENCE SUPPRESSION/CANCELLATION

CROSS REFERENCE TO RELATED APPLICATION

This application claims the benefit under 35 U.S.C. § 119(e) to U.S. Provisional Patent Application No. 61/822,249 entitled "COORDINATED MULTIPOINT (CoMP) AND NETWORK ASSISTED INTERFERENCE SUPPRESSION/CANCELLATION" filed on May 10, 2013 the disclosure of which is expressly incorporated herein by reference in its entirety.

BACKGROUND

Field

Aspects of the present disclosure relate generally to wireless communication systems, and more particularly to the interaction between coordinated multipoint operation and network assisted interference suppression and/or interference cancellation in a wireless network.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

SUMMARY

In one aspect of the present disclosure, a method of wireless communication is disclosed. The method includes identifying a first virtual cell identity. The method also includes determining one or more virtual cells based on the identified first virtual cell identity. The method further includes processing one or more channels based on the determination.

Another aspect of the present disclosure is directed to an apparatus including means for identifying a first virtual cell identity. The apparatus also includes means for determining one or more virtual cells based on the identified first virtual cell identity. The apparatus further includes means for processing one or more channels based on the determination.

In another aspect of the present disclosure, a computer program product for wireless communications in a wireless network having a non-transitory computer-readable medium is disclosed. The computer readable medium has non-transitory program code recorded thereon which, when executed by the processor(s), causes the processor(s) to perform operations of identifying a first virtual cell identity. The program code also causes the processor(s) to determine one or more virtual cells based on the identified first virtual cell identity. The program code further causes the processor(s) to process one or more channels based on the determination.

Another aspect of the present disclosure is directed to an apparatus for wireless communication having a memory and at least one processor coupled to the memory. The processor(s) is configured to identify a first virtual cell identity. The processor(s) is also configured to determine one or more virtual cells based on the identified first virtual cell identity. The processor(s) is further configured to process one or more channels based on the determination.

In one aspect of the present disclosure, a method of wireless communication is disclosed. The method includes determining a difference in observed interference between multiple measurement resources. The method also includes reporting channel state information based on the determined difference.

Another aspect of the present disclosure is directed to an apparatus including means for determining a difference in observed interference between multiple measurement resources. The apparatus also includes means for reporting channel state information based on the determined difference.

In another aspect of the present disclosure, a computer program product for wireless communications in a wireless network having a non-transitory computer-readable medium is disclosed. The computer readable medium has non-transitory program code recorded thereon which, when executed by the processor(s), causes the processor(s) to perform operations of determining a difference in observed interference between multiple measurement resources. The program code also causes the processor(s) to report channel state information based on the determined difference.

Another aspect of the present disclosure is directed to an apparatus for wireless communication having a memory and at least one processor coupled to the memory. The processor(s) is configured to determine a difference in observed interference between multiple measurement resources. The processor(s) is also configured to report channel state information based on the determined difference.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 17 is a chart illustrating an exemplary virtual cell configuration according to an aspect of the present disclosure.

DETAILED DESCRIPTION

Figure 1:
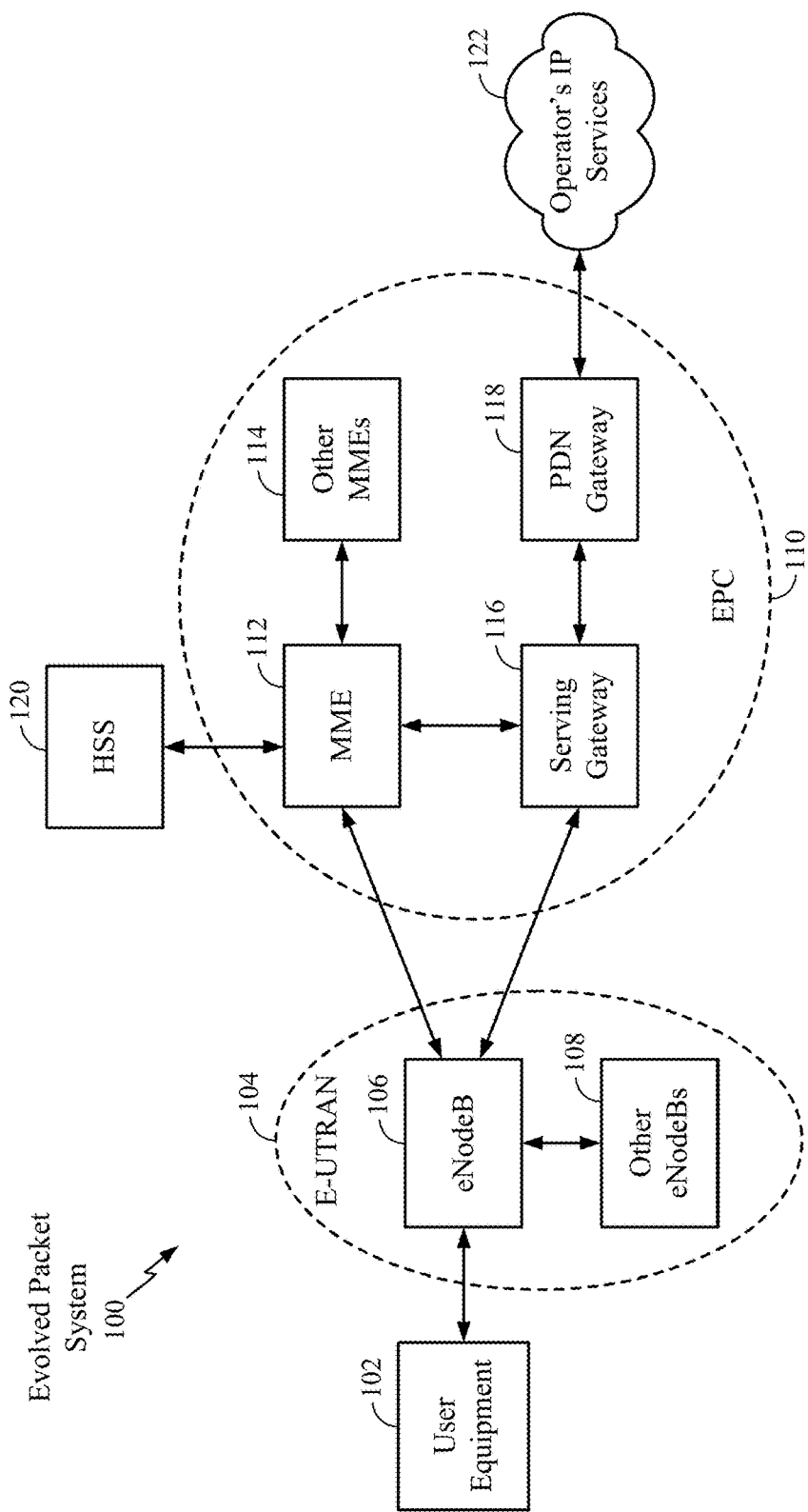
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB or eNB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
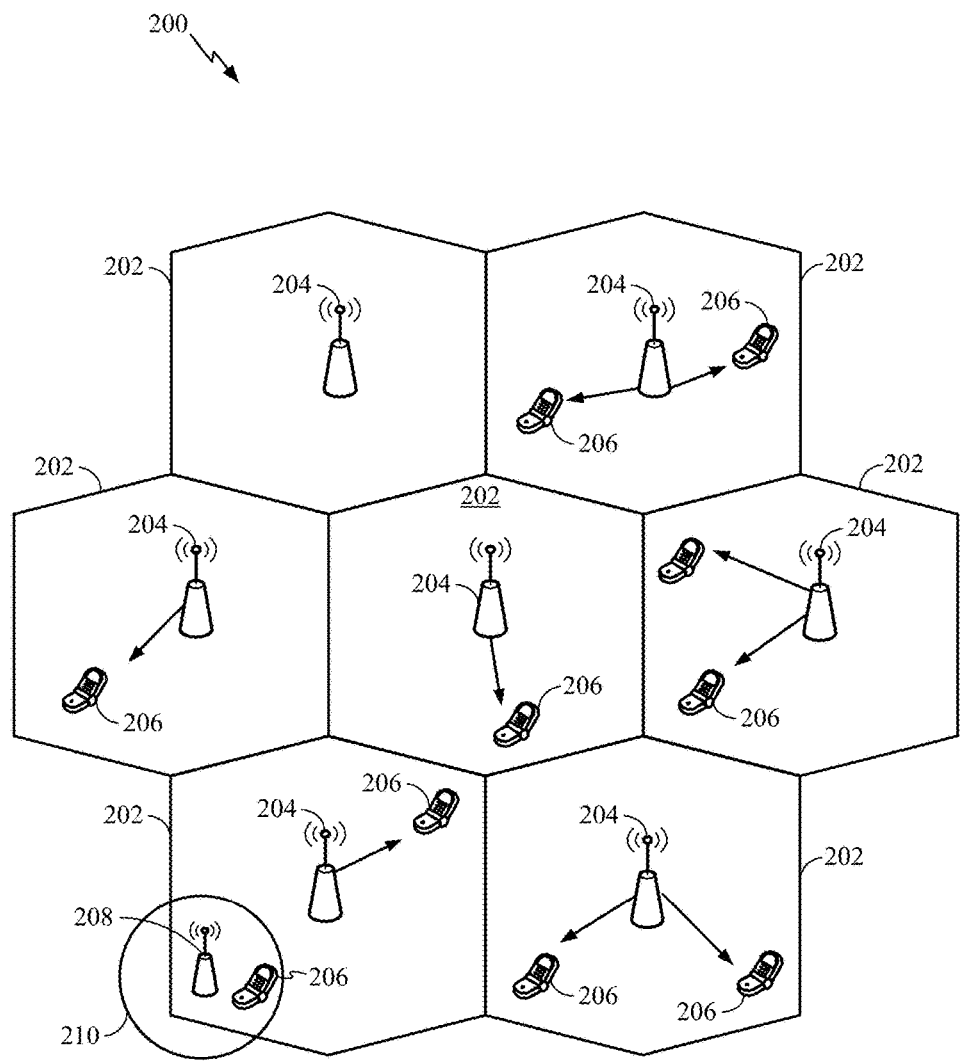
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. A lower power class eNodeB 208 may be a remote radio head (RRH), a femto cell (e.g., home eNodeB (HeNB)), a pico cell, or a micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
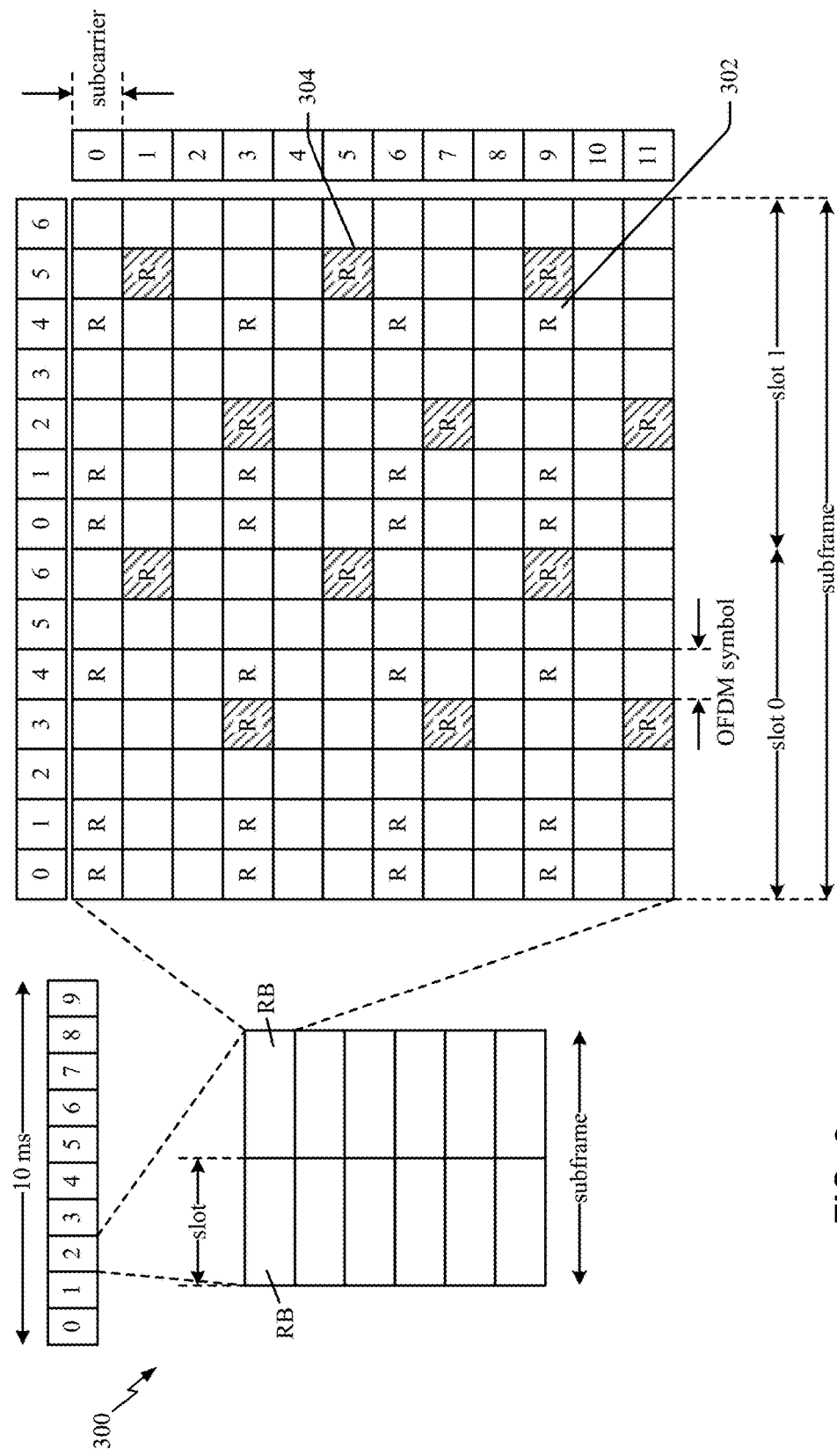
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) (also referred to as demodulation RS or DM-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
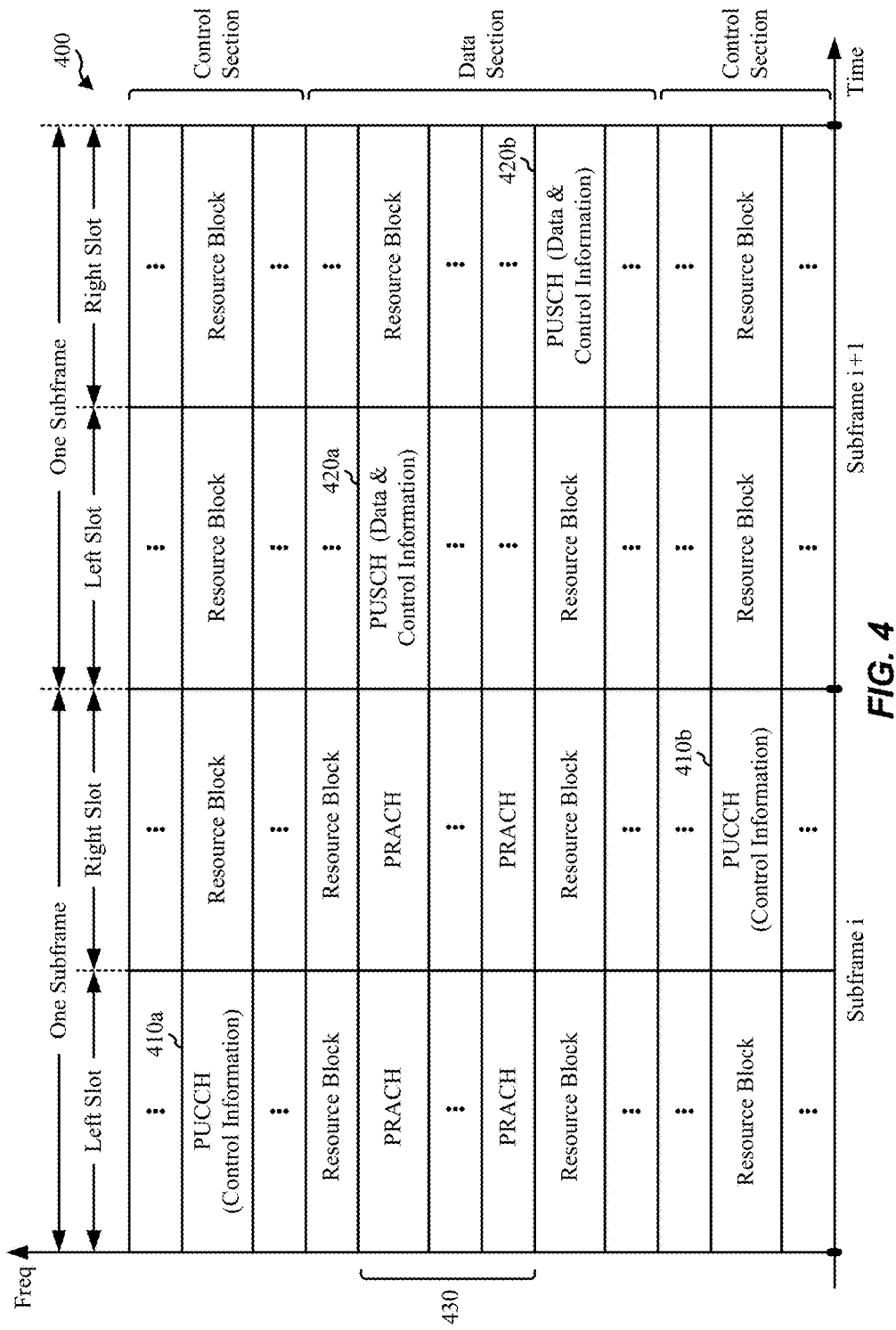
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
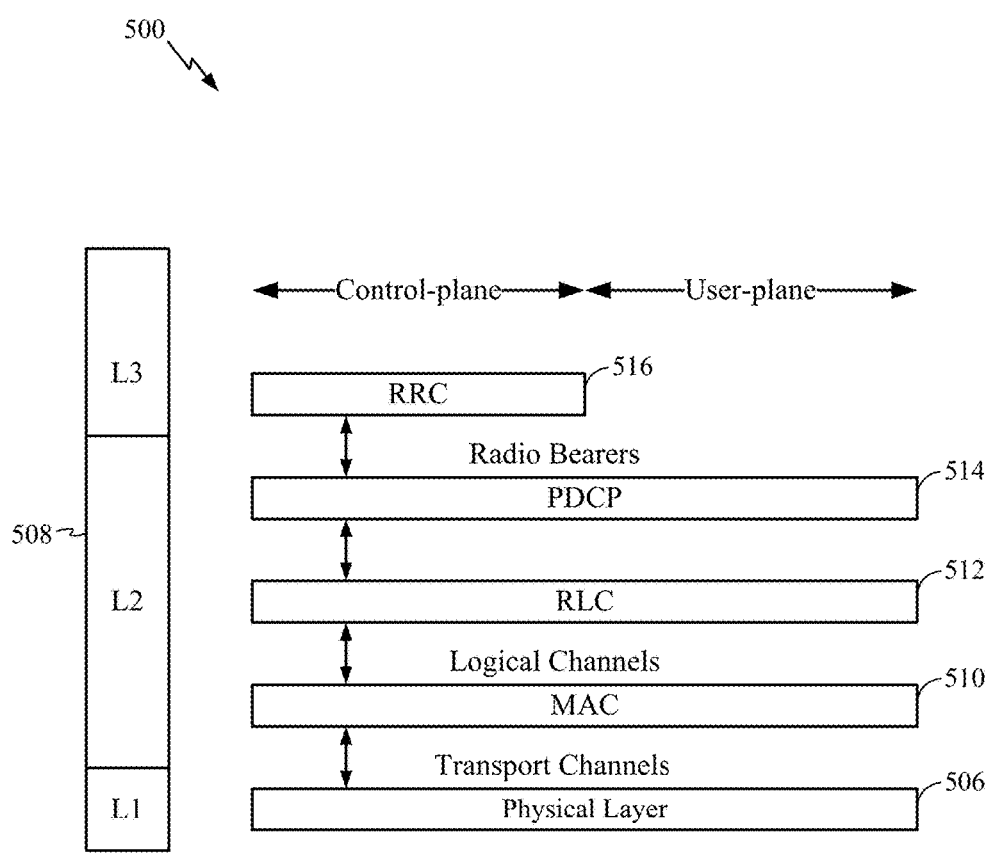
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
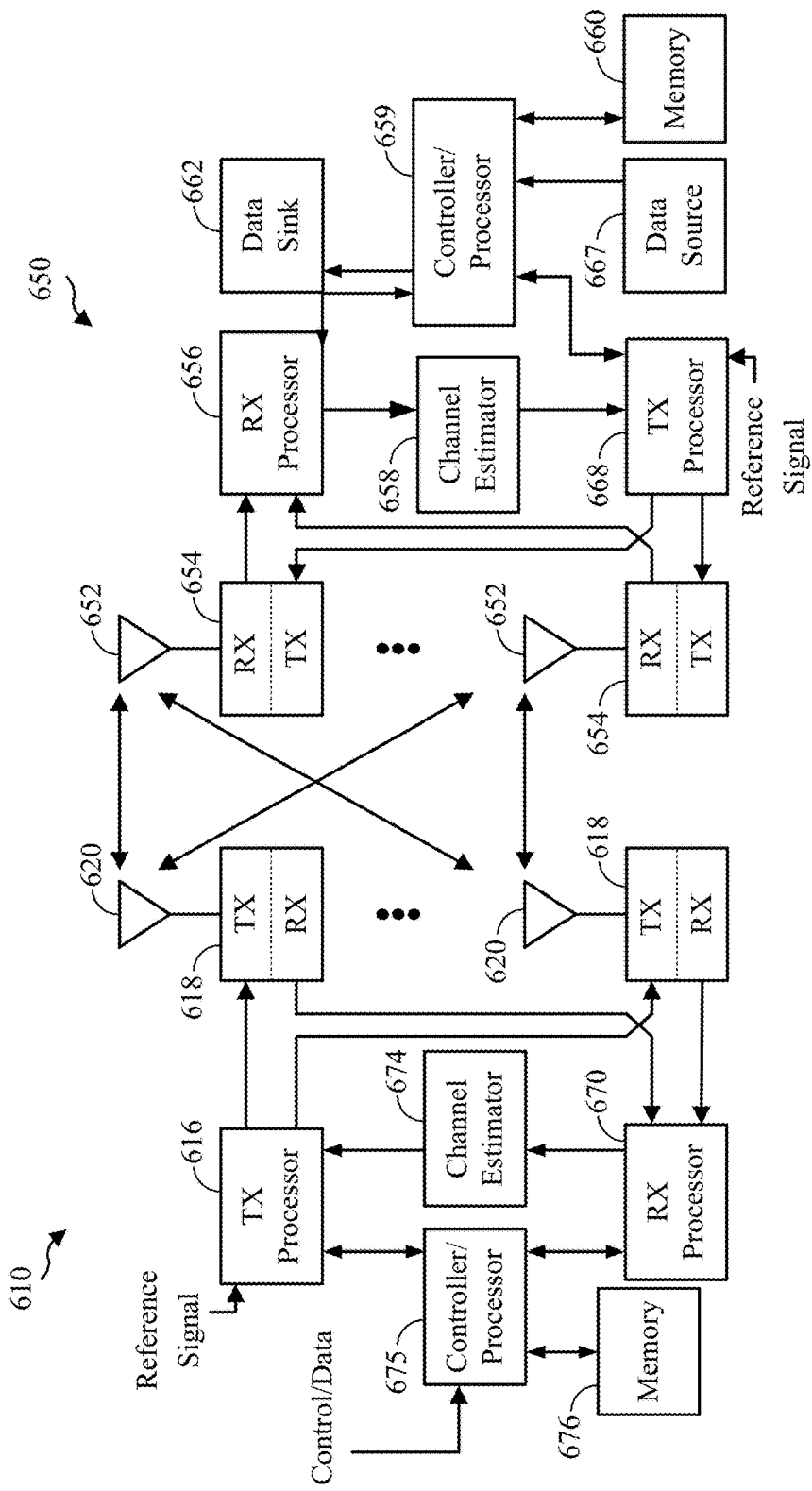
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Carrier Aggregation

LTE-Advanced UEs may be allocated 20 Mhz bandwidths of spectrum in a system that uses carrier aggregation (CA). Generally, there is less uplink traffic in comparison to downlink traffic. Therefore, the uplink spectrum allocation may be less than the downlink allocation. For example, if 20 Mhz is assigned to the uplink, the downlink may be assigned 100 Mhz. Asymmetric frequency division duplexing assignments may conserve spectrum and may be desirable for the conventional asymmetric bandwidth used by broadband subscribers.

Figure 7:
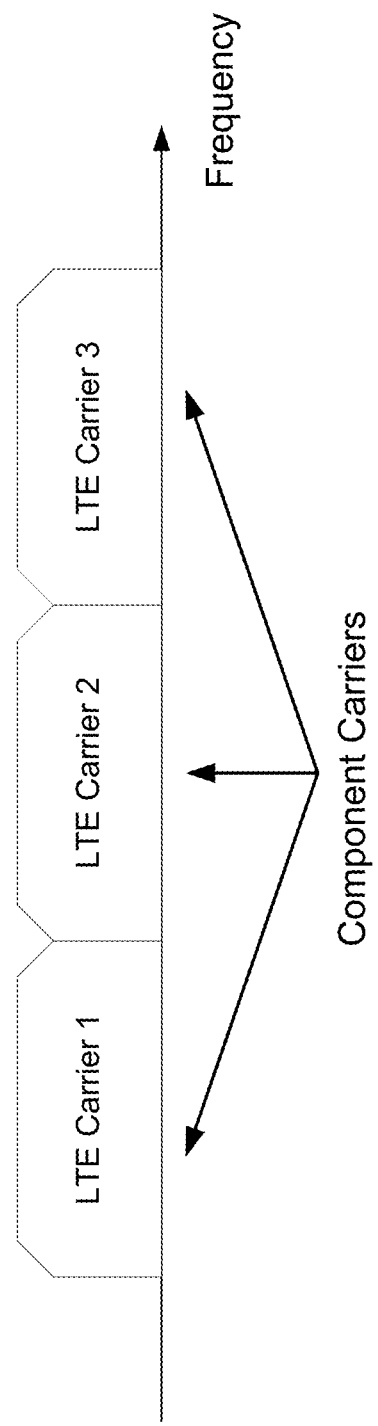
FIG. 7 is a diagram illustrating a continuous carrier aggregation type.
Figure 8:
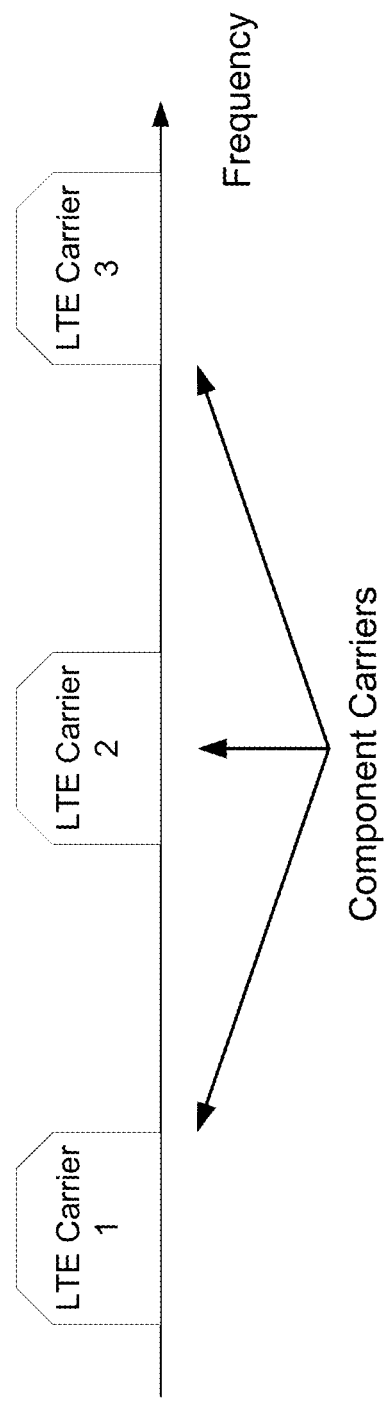
FIG. 8 is a diagram illustrating a non-continuous carrier aggregation type.

For LTE-Advanced mobile systems, two types of carrier aggregation systems have been proposed, continuous carrier aggregation and non-continuous carrier aggregation. As shown in FIG. 7, multiple available component carriers adjacent to each other are referred to as continuous carrier aggregation. Alternatively, as shown in FIG. 8, multiple available component carriers separated along the frequency band are referred to as non-continuous carrier aggregation. Both non-continuous and continuous carrier aggregation systems aggregate multiple component carriers to serve a single unit of an LTE Advanced UE.

Multiple radio frequency receiving units may be deployed with non-continuous carrier aggregation because the carriers are separated along the frequency band. Still, because non-continuous carrier aggregation supports data transmissions over multiple separated carriers across an increased frequency range, propagation path loss, Doppler shift, and other radio channel characteristics may vary at different frequency bands.

Thus, to support broadband data transmission for the non-continuous carrier aggregation, the coding, modulation and transmission power for different component carriers may be adaptively adjusted. For example, in an LTE-Advanced system with an evolved NodeB (eNodeB) having a fixed transmitting power for each component carrier, the coverage or supportable modulation and coding of each component carrier may be different.

Figure 9:
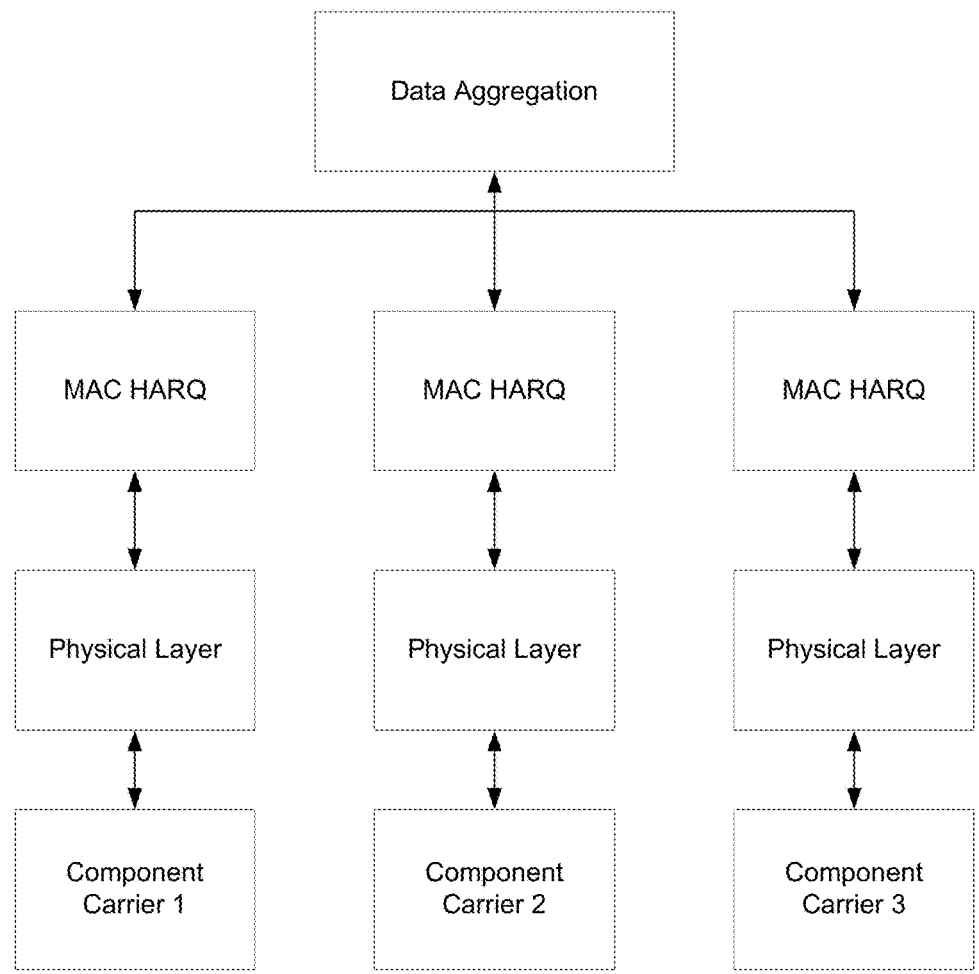
FIG. 9 is a diagram illustrating MAC layer data aggregation.

FIG. 9 illustrates aggregating transmission blocks (TBs) from different component carriers at the medium access control (MAC) layer (FIG. 5) for an IMT-Advanced system. With MAC layer data aggregation, each component carrier has an independent hybrid automatic repeat request (HARQ) entity in the MAC layer and a transmission configuration parameters (e.g., transmitting power, modulation and coding schemes, and multiple antenna configuration) in the physical layer. Similarly, in the physical layer, one HARQ entity is provided for each component carrier.

Figure 10:
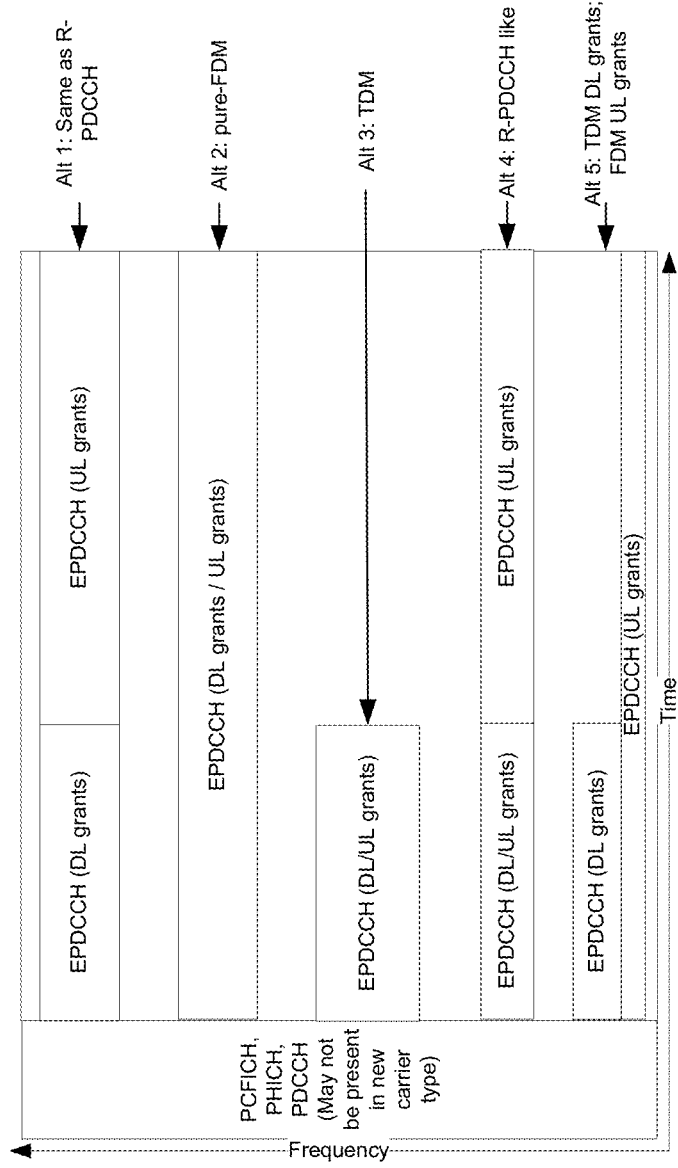
FIG. 10 is a diagram illustrating various EPDCCH structures.

FIG. 10 illustrates various enhanced control channel structures, such as an enhanced PDCCH (EPDCCH). As an example, the enhanced control channel structure may be the same as the relay control channel (R-PDCCH) structure. Alternatively, the enhanced control channel may be pure frequency division multiplexing (FDM). Optionally, in an alternate structure, the enhanced control channel structure may be all time division multiplexing (TDM). Alternatively, the enhanced control channel is similar, but not the same as the relay control channel. In another alternate structure, the enhanced control channel may combine time division multiplexing and frequency division multiplexing.

Coordinated Multipoint (CoMP)

In Release 11, coordinated multipoint (CoMP) transmission schemes are supported. CoMP refers to schemes where multiple base stations coordinate transmissions to (downlink CoMP) or receptions from (uplink CoMP) one or more UEs. Downlink CoMP and uplink CoMP can be separately or jointly enabled for a UE. Examples of CoMP schemes include joint transmission, joint reception, coordinated beamforming and dynamic point selection (DPS). For a joint transmission (DL CoMP), multiple eNodeBs transmit the same data for a UE. For joint reception (UL CoMP), multiple eNodeBs receive the same data from a UE. Coordinated beamforming refers to an eNodeB transmitting to a UE using beams that are chosen to reduce interference to UEs in neighboring cells. Dynamic point(s) selection (DPS) refers to data transmissions of cell(s) changing from subframe to subframe.

CoMP may exist in homogeneous networks and/or heterogeneous networks (HetNet). The connection between the nodes may be X2 (some latency, limited bandwidth) or fiber (min latency and "unlimited" bandwidth). In heterogeneous networks CoMP, low power nodes may be referred to as micro cells, small cells, pico cells, femto cells, relay node, and/or remote radio head (RRH).

Figure 11:
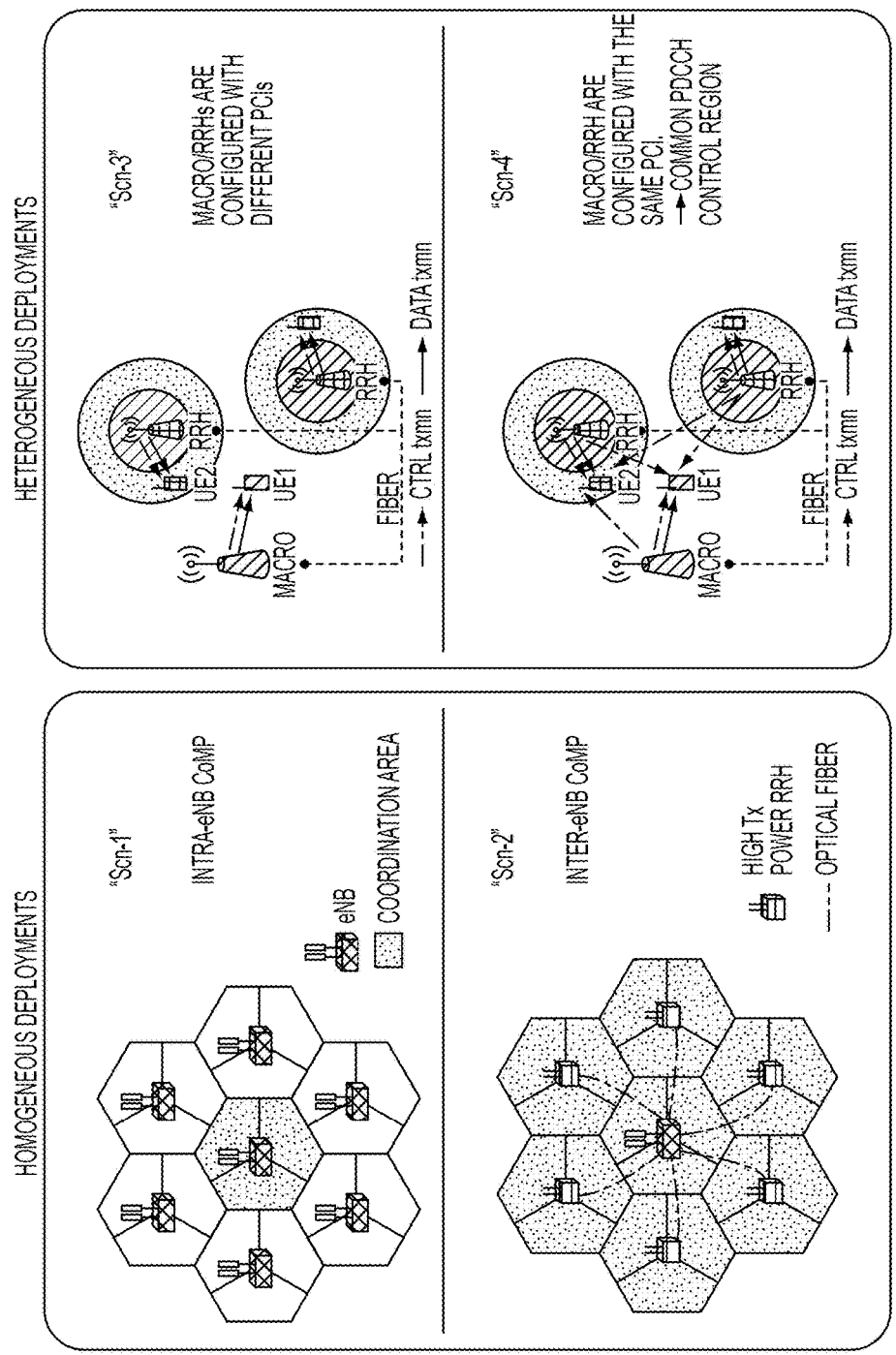
FIG. 11 is a diagram illustrating homogeneous and heterogeneous CoMP deployment scenarios according to an aspect of the present disclosure.

As illustrated in FIG. 11, CoMP may be used in various deployment scenarios, including homogeneous and heterogeneous deployments. For example, CoMP may be used across cells of the same macro site. This scenario (Scn-1) may be referred to as Intra-eNB CoMP because the coordination area is within the same macro site. As another example, CoMP may be used across neighboring macro sites. This scenario (Scn-2) may be referred to as Inter-eNB CoMP because the coordination area is across neighboring macro sites. In a heterogeneous network, CoMP may be used across a macro cell and pico cells/remote radio heads (RRHs). In one scenario (Scn-3) of a heterogeneous network, the macro cell and the pico cells/RRHs are configured with different cell IDs or physical cell IDs (PCIs). Accordingly, in Scn-3, the macro cell may transmit a control channel and data channel to a first UE (UE1), and the RRC may transmit a control channel and data channel to a second UE (UE2) within its coverage area. In another scenario (Snc-4) of a heterogeneous network, the macro cell and pico cells/RRHs are configured with the same cell IDs or PCI. As such, the macro cell and RRHs may transmit a common control channel to both UE1 and UE2. Alternatively, the macro may transmit a data channel to UE1 and the RRH may transmit a data channel to UE2. The use of CoMP across a macro cell and pico cells configured with the same cell IDs may reduce inter-cell interference due to cell-specific reference signals. In various scenarios, a UE may be configured with one or more virtual CoMP cells for CoMP operation.

Network Assisted Interference Cancellation/Interference Suppression (NAIC)

For data channels and/or control channels, various co-channel inter-cell interference conditions and intra-cell interference conditions may be experienced. In some cases, intra-cell interference may result from single user multiple input multiple output (SU-MIMO) and multiple user MIMO (MU-MIMO) operation. Additionally, inter-cell interference may be based on deployment scenarios specified in LTE Release 11, such as a small cell deployment. Additionally, co-channel interference scenarios may be experienced from homogeneous and heterogeneous networks.

Quasi-Co-Location

When a CoMP operation is specified for a network, the UE may assume that signals are transmitted from the same site. In some cases, it may be desirable to inform the UE of an origin (e.g., access point) for a shared channel and/or enhanced control transmission. In one configuration, quasi-co-location (QCL) is specified to retain antenna port transparency when informing the UE of the origin of a shared channel transmission and/or an enhanced channel transmission. Two antenna ports may be quasi-co-located if propagation properties of a symbol transmission via a first antenna port can be inferred from another symbol transmission via a second antenna port. Examples of parameters may include, but are not limited to, delay spread, Doppler spread, frequency shift, average received power, and/or received timing. In some cases, the quasi-co-location may apply to a subset of these parameters. It should be noted that the parameters may be referred to as large scale parameters.

Figure 12:
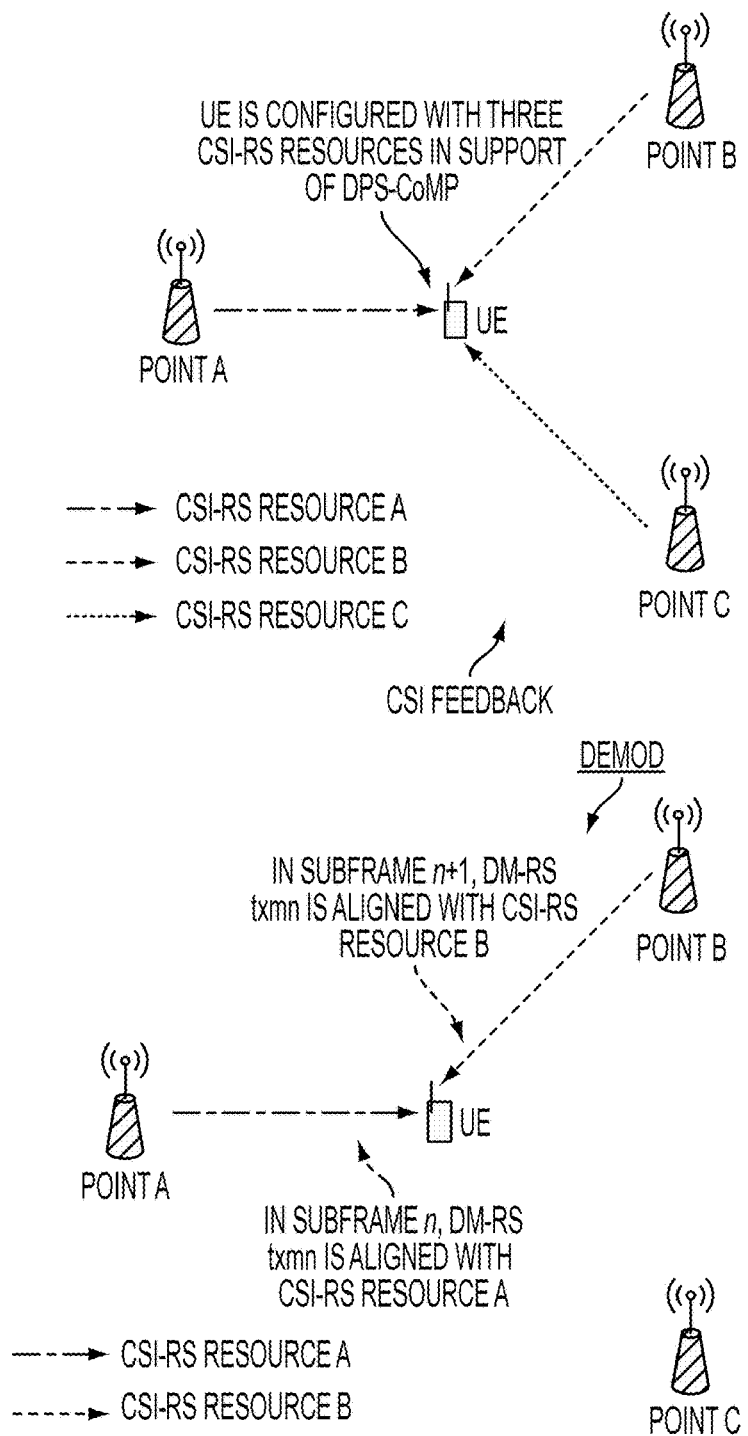
FIG. 12 is a diagram illustrating Quasi-co-location (QCL) behaviors according to an aspect of the present disclosure.

FIG. 12 illustrates an example operation according to an aspect of the present disclosure. In one configuration, the UE is configured with three channel state information-reference signal (CSI-RS) resources from three different access points (e.g., first access points, second access points, and third access points) in support of dynamic point selection CoMP. As a result, the UE may provide CSI feedback to the first access points, the second access points, and/or the third access points based on the CSI-RS resources. When receiving downlink control information (DCI) scheduling for a shared channel, for improved demodulation performance the UE is informed of a CSI-RS that is quasi-co-located with the shared channel demodulation reference signal. For example, in a first subframe n, the shared channel demodulation reference signal transmission may be aligned with a first CSI-RS resource from the first access point. Furthermore, in a second subframe n+1, the shared channel demodulation reference signal transmission may be aligned with a second CSI-RS resource from the second access point.

Quasi-co-location (QCL) properties may differ between quasi-co-locations in a same reference signal (RS) type and quasi-co-locations in different reference signal types. Examples of reference signal types include, but are not limited to, a non-zero power (NZP) channel state information reference signal, common reference signal, enhanced physical downlink control channel demodulation reference signal, and/or physical downlink shared channel demodulation reference signal.

For a quasi-co-location within a non-zero power channel state information reference signal resource, the ports may be quasi co-located for the delay spread, receiver power, frequency shift, Doppler spread, and/or received timing. Additionally, for quasi-co-location within a common reference signal, ports may be quasi co-located for various channel properties, such as delay spread, receiver power, frequency shift, Doppler spread, and/or received timing. Furthermore, for quasi-co-location within a demodulation reference signal, ports for a control channel or a shared channel may be quasi co-located within a subframe for a delay spread, receiver power, frequency shift, Doppler spread, and/or received timing.

Additionally, in one configuration, quasi-co-location behaviors across different reference signal types are specified. In one configuration, quasi-co-location is spread across a primary synchronization signal, a secondary synchronization signal (PSS/SSS) and a common reference signal. In this configuration, the PSS/SSS and common reference signal ports for a serving cell are quasi co-located for a frequency shift and/or a received timing.

Additionally, in another configuration, quasi-co-location is spread across shared channel demodulation reference signals, control channel demodulation reference signals, channel state information reference signals, and common reference signals. In this configuration, both legacy and CoMP systems are considered. For legacy systems, the common reference signal, channel state information reference signal, control channel demodulation reference signal, and shared channel demodulation reference signal may be quasi co-located for frequency shift, Doppler spread, received timing, and/or delay spread.

Alternatively, for CoMP systems, the common reference signal, channel state information reference signal, control channel demodulation reference signal, and shared channel demodulation reference signal are not considered quasi-co-located. In this configuration, as an exception, the shared channel demodulation reference signal and a specific channel state information reference signal resource may be quasi co-located for the delay spread, Doppler spread, Doppler shift, and/or average delay. In this configuration, the specific channel state information reference signal is indicated by physical layer signaling. Moreover, the present configuration facilitates time tracking based on the signaled non-zero powered channel state information reference signal resource.

Furthermore, in the present configuration, as another exception, for each channel state information reference signal resource, the network indicates, by RRC signaling, the channel state information reference signal ports and common reference signal ports of a cell that are quasi co-located with respect to Doppler shift and Doppler spread. In this configuration, frequency tracking may be facilitated and improved in comparison to frequency tracking with only a channel state information reference signal.

Figure 13:
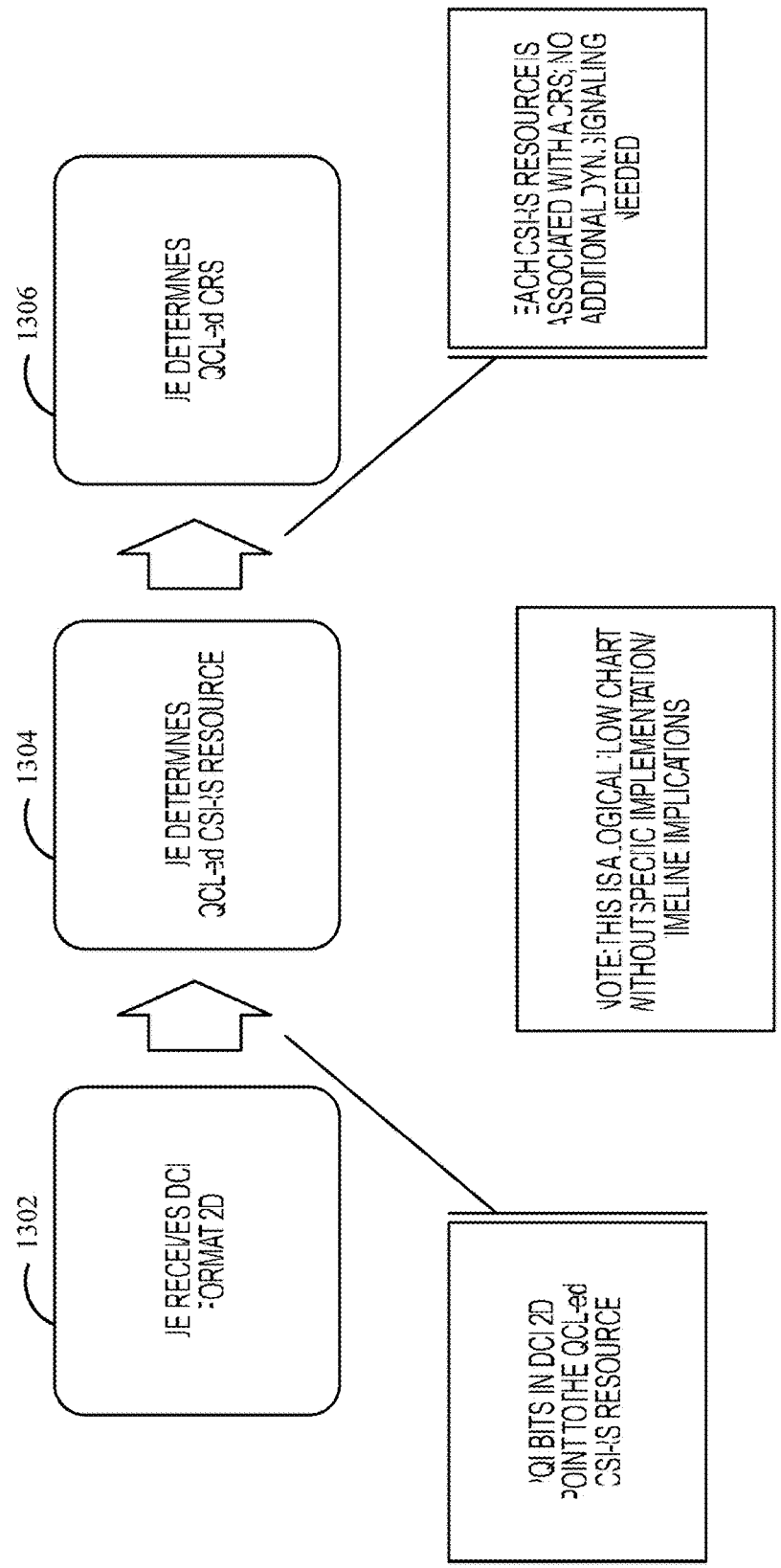
FIG. 13 is a diagram illustrating QCL behavior for CoMP operation according to an aspect of the present disclosure.

FIG. 13 illustrates a flow diagram for quasi co-location across different reference signal types in a CoMP system. In one configuration, as shown in FIG. 13, at block 1302, the UE receives a 2-bit information field in downlink control information (DCI) format 2D. The shared channel rate matching and quasi co-location indication (PQI) bits in DCI format 2D indicate the quasi-co-located channel state information reference signal resource. Furthermore, at block 1304, the UE determines the quasi-co-located channel state information reference signal resource from the received PQI. Each channel state information reference signal resource is associated with a common reference signal. Finally, at block 1306, the UE determines the quasi-co-located common reference signal.

Figure 14:
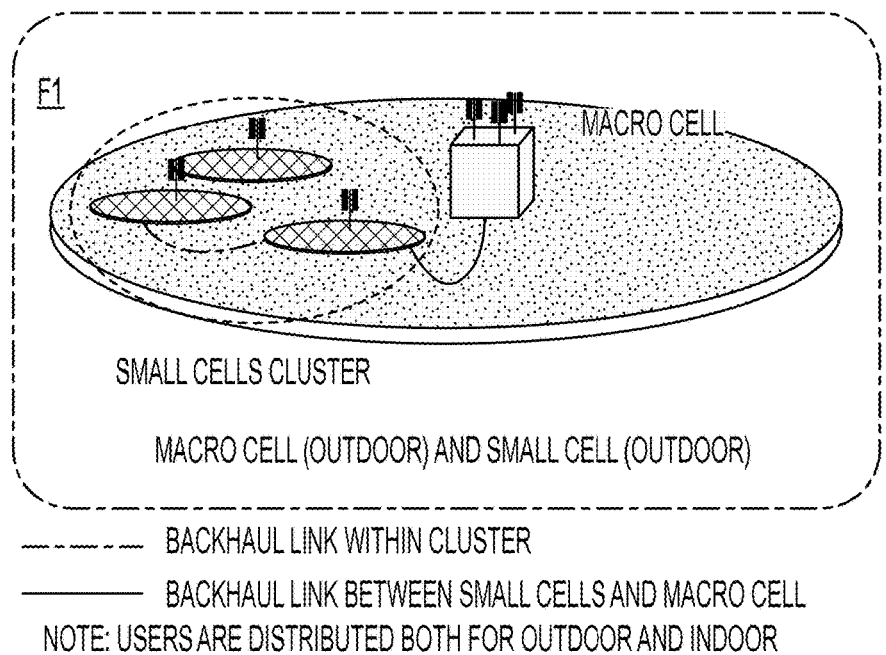
FIGS. 14, 15A, 15B and 16 are diagrams illustrating various deployment scenarios according to aspects of the present disclosure.
Figure 15A:
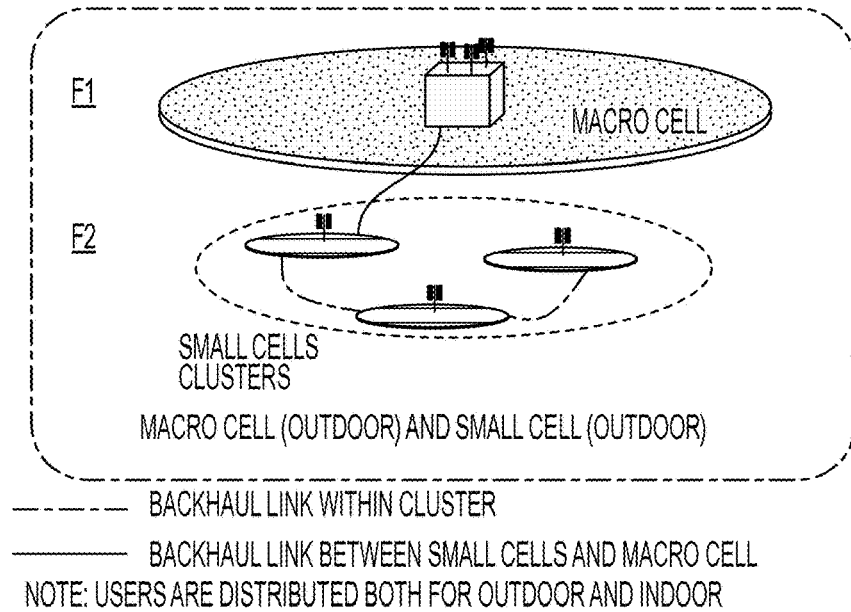
Figure 15B:
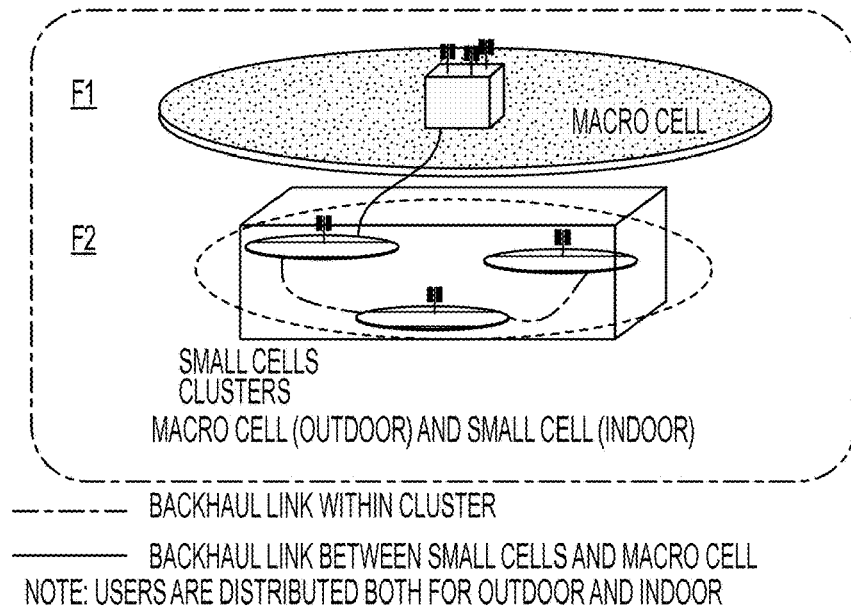
Figure 16:
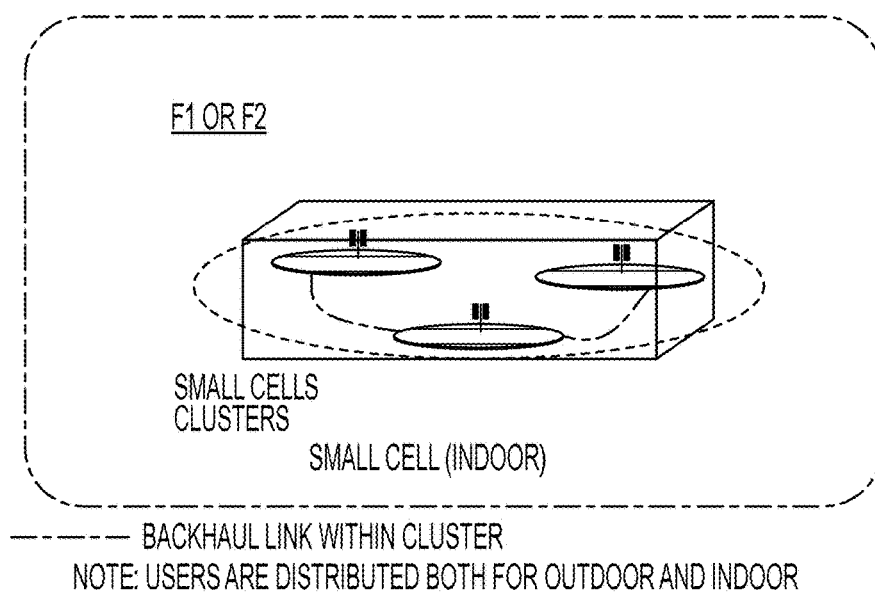

FIGS. 14-16 illustrate examples of various deployment scenarios. For example, FIG. 14 illustrates a one layer deployment scenario including a macro cell positioned outdoors along with a small cell cluster that is also positioned outdoors. A backhaul link is specified between the macro cell and the small cell cluster. Additionally, another backhaul link is specified for the small cell cluster. In this example, the UEs may be outdoors and/or indoors.

FIGS. 15A and 15B illustrate examples of multiple carriers, such as a macro cell using carrier F1 and a small cell cluster using carrier F2. In particular, FIG. 15A illustrates a macro cell positioned outdoors along with a small cell cluster. A backhaul link is specified between the macro cell and the small cell cluster. Another backhaul link is specified for the small cell cluster.

FIG. 15B illustrates a macro cell positioned outdoors and a small cell cluster positioned indoors. A backhaul link is specified between the macro cell and the small cell cluster. Additionally, another backhaul link is specified within the small cell cluster. For both FIGS. 15A and 15B the UEs are distributed outdoors and/or indoors.

FIG. 16 illustrates an exemplary deployment without macro cells. The small cell cluster is positioned indoors with a backhaul link specified for the cluster. The small cell cluster may use carrier F1 or carrier F2. The UEs are distributed both outdoors and indoors.

One aspect of the present disclosure is directed to managing network assisted interference cancellation (NAIC) for a CoMP UE. In particular, a CoMP UE may be dynamically configured with a DCI format indicating one set of parameters from multiple sets of parameters for shared channel rate matching and quasi co-location operation. As previously discussed, DCI format 2D may include a 2-bit information field, such as a PQI field. The 2-bit information field dynamically indicates the parameters for shared channel rate matching and the channel state information reference signal configuration for a quasi co-location operation.

In one configuration, one or more sets of parameters associated with one or more PQI values configured for the UE for CoMP operation are linked with characteristics of interfering UEs for network assisted interference cancellation. The 2 bit PQI may correspond to sets of radio resource control configured parameters. As an example, the 2 bit PQI corresponds to four sets of radio resource control configured parameters. Each set of the parameters configured for the PQI operation may be a set of parameters to use for network assisted interference cancellation. The set of parameters associated with a PQI value may be used by other UEs.

Additionally or separately, one or more sets of parameters linked with a virtual cell ID (VCI) configured for the UE may be linked for network assisted interference cancellation. In one configuration, one or more virtual cell IDs for a CoMP UE are separately indicated. In another configuration, the one or more virtual cell IDs are linked with one or more PQI values.

The UE can be provided a set of virtual cells for network assisted interference cancellation. Each virtual cell may be associated with a set of parameters, e.g., a virtual cell ID, a starting symbol for PDSCH, a number of cell-specific reference signals ports, and/or frequency shift for cell-specific reference signals. The set of virtual cells may be provided on a per PQI basis. Alternatively, for a CoMP operation the virtual cells may be provided on a per virtual cell ID basis.

In one configuration, the set of virtual cells are independent from PQI management. That is, PQI and virtual cell dependent signaling is not received by the UE. As an example, a UE is provided a first set of virtual cell IDs for network assisted interference cancellation and a second set of PQI states for CoMP operation. In some cases, the UE may not assume a correlation between the first set of virtual cell IDs and the second set of PQI states. In another configuration, a link between a specific PQI can be established with a virtual cell ID. As an example, a virtual cell ID for network assisted interference cancellation may be linked to a PQI state such that the set of parameters associated with the PQI state can be associated with the virtual cell ID for network assisted interference cancellation/suppression. Additionally, some virtual cell IDs may correspond to an empty state to bypass interference cancellation and/or interference suppression. The parameters may include a virtual cell ID, a number of CRS ports, a CRS shift, and/or other information used by the UE to detect interferers and perform interference cancellation and/or interference suppression.

FIG. 17 illustrates an exemplary virtual cell configuration according to an aspect of the present disclosure. As shown in FIG. 17, each PQI value is associated with a set of virtual cells and each virtual cell is further associated with a set of parameters for network assisted interference cancellation. For example, the PQI value 00 is associated with four virtual cells. Each virtual cell (VC1, VC2, VC3, and VC4) is associated with a specific parameter set. As an example, a first virtual cell (VC1) is associated with parameter set 1. As previously discussed, the parameter set may include information such as a virtual cell ID, a number of CRS ports, a CRS shift, and/or other information used by the UE to detect interferers and perform interference cancellation and/or interference suppression.

Furthermore, as shown in FIG. 17, for the PQI value 01, the first three virtual cells (VC1, VC2, and VC3) are based on the parameters configured for CoMP operations associated with PQI 00, 10, and 11. Additionally, a separate set of parameters, parameter set 5, are configured for the fourth virtual cell (VC4). In the example shown in FIG. 17, the fourth virtual cell is empty for the PQI value 11. Because the fourth virtual cell is empty, the UE detects and attempts to cancel and/or suppress interference from only three virtual cells (VC1, VC2, and VC3).

Furthermore, as shown in FIG. 17, that parameter set 5 is configured for both the third virtual cell (VC3) of PQI value 11 and the fourth virtual cell (VC4) of PQI value 01. It is understood the table of FIG. 17 is one example, and other configurations may be specified to associate the PQI with virtual cells associated with a set of parameters for network assisted interference cancellation. Thus, a CoMP UE may be configured with a set of network assisted interference cancellation cells that are dependent on a virtual CoMP cell and/or a PQI.

In some cases, it is desirable to determine the timing of a serving cell and/or other cells. In one configuration, for serving cell fast Fourier transform (FFT) timing, the timing is determined based on the parameters indicated via the PQI. In various aspects, the timing may be determined based on the virtual cell IDs, the sets of parameters, and/or the virtual cells associated with the indicated PQI.

Furthermore, for interference suppression/cancellation, the timing may be determined based on the aggregation over one or more of the configured PQI values. For example, timing may be determined based on the average over all possible quasi co-location combinations. In another configuration, the timing is based on the average over all possible virtual cells configured for a PQI and virtual cell ID. The set of cells for timing determination may be indicated to the UE. Although described for the PQI, the aforementioned configuration may also be applied to virtual cell IDs.

Another aspect of the present disclosure is directed to interference measurement resource (IMR) usage. That is, the UE may use resource elements with zero power to estimate interference. In one configuration, for CSI feedback, the UE estimates interference by canceling one or more shared channel interferers observed from one or more interference measurement resources or tones for interference measurement. The aforementioned canceling of one or more shared channel interferers may improve interference estimation reflecting the network assisted interference cancellation. Moreover, the canceling of one or more shared channel interferers is dependent on the reliability of performing interference cancellation using a limited number of interference measurement resource elements.

In another configuration, for CSI feedback, two or more interference measurement resources are used to determine the difference between observed interference from different interferers. The CSI is reported based on the difference. For example, a first interference measurement resource may observe the strongest interferer, while a second interference measurement resource does not observe the strongest interferer (e.g., by configuring zero power channel state information reference signals in the strongest interferer). The difference may be reflected in the CSI feedback. The second interference measurement resource may reflect improved interference cancellation of the dominant interferer.

Figure 18:
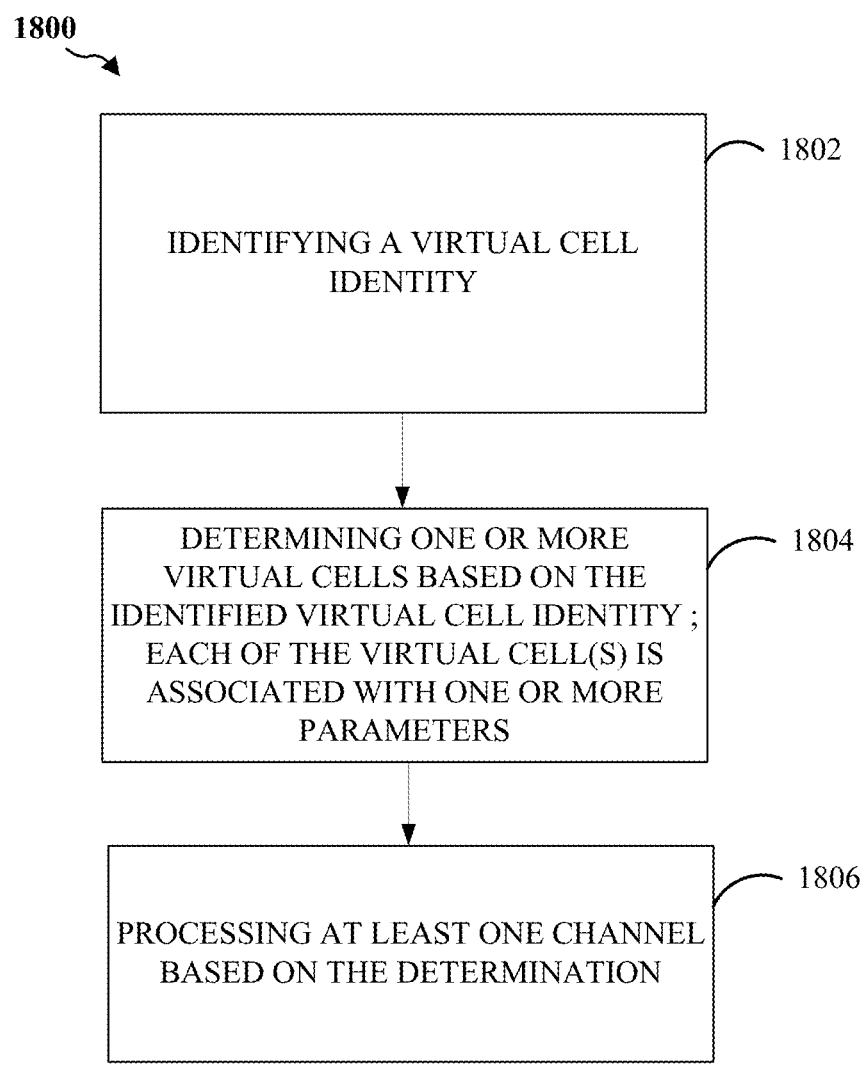
FIG. 18 is a block diagram illustrating a method of wireless communication according to an aspect of the present disclosure.

FIG. 18 illustrates a method 1800 for wireless communication. In block 1802, a UE identifies a VCI. In block 1804, the UE determines one or more virtual cells based on the identified VCI. Each of the one or more virtual cells is associated with one or more parameters. The one or more parameters for each virtual cell may include a cell identity, a number of ports for cell-specific reference signals, a frequency shift of cell-specific reference signals, a demodulation reference signal, a modulation order for a data channel or a control channel, and/or one or more channel state information reference signal configurations. The UE may use such information to detect interferers and perform interference cancellation/interference suppression. Next, in block 1806, the UE processes one or more channels based on the determination. The channel(s) may be a data channel or a control channel.

In one configuration, the UE 650 is configured for wireless communication including means for identifying. In one aspect of the present disclosure, the identifying means is the antenna 652, receivers 654, RX processor 656, controller/processor 659, receiving module 1902, and/or memory 660 configured to perform the functions recited by the identifying means. The UE 650 is also configured to include a means for determining. In one aspect of the present disclosure, the determining means is the controller/processor 659, determining module 1904, and/or memory 660 configured to perform the functions recited by the determining means. The UE 650 is also configured to include a means for processing. In one aspect of the present disclosure, the processing means is the controller/processor 659, processing module 1906, and/or memory 660 configured to perform the functions recited by the processing means. In another aspect, the aforementioned means are any module or any apparatus configured to perform the functions recited by the aforementioned means.

Figure 19:
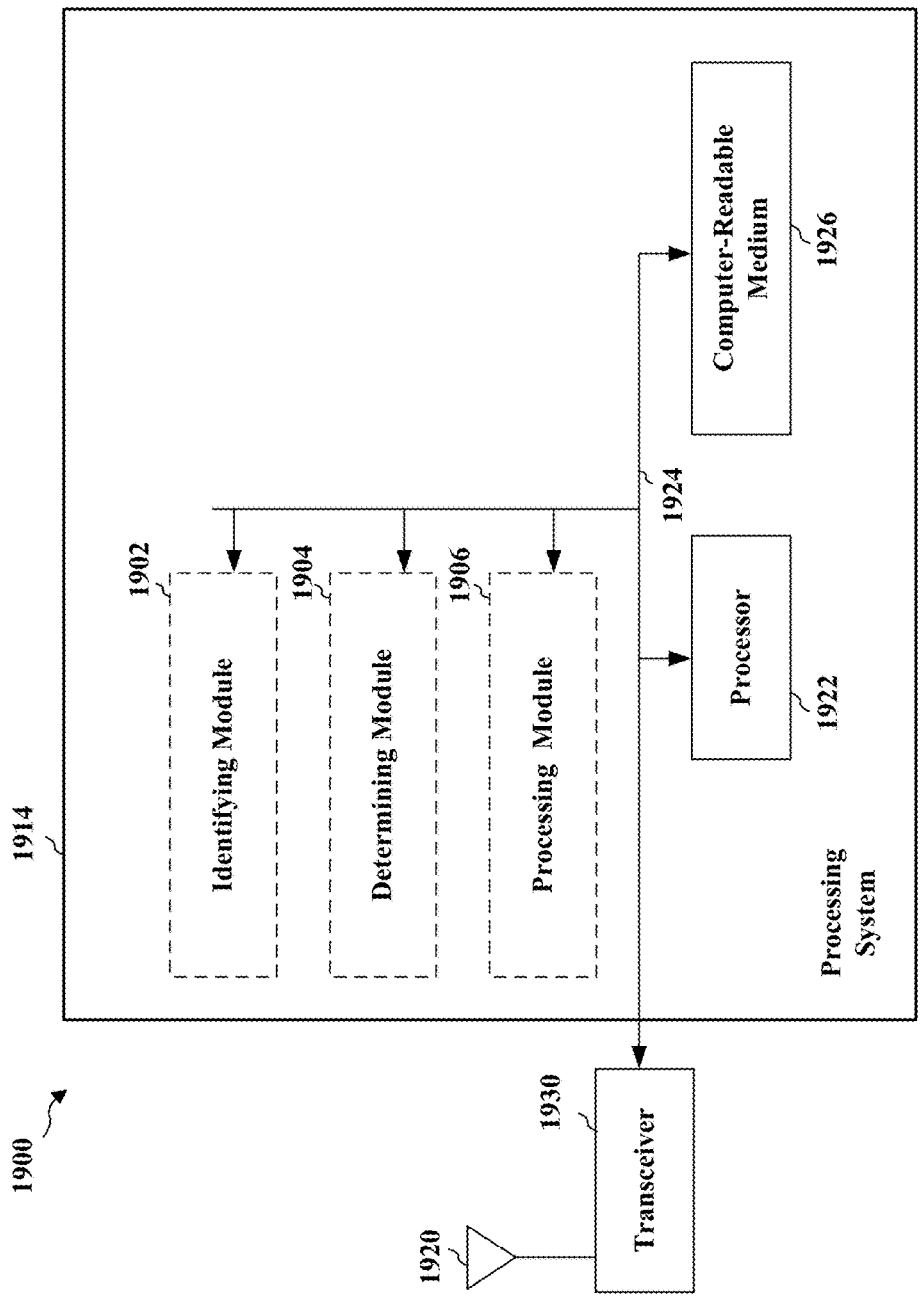
FIG. 19 is a block diagram illustrating different modules/means/components in an exemplary apparatus.

FIG. 19 is a diagram illustrating an example of a hardware implementation for an apparatus 1900 employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware modules, represented by the processor 1922 the modules 1902, 1904, 1906 and the computer-readable medium 1926. The bus 1924 may also link various other circuits such as timing sources, peripherals, voltage regulators, and power management circuits, which are well known in the art, and therefore, will not be described any further.

The apparatus includes a processing system 1914 coupled to a transceiver 1930. The transceiver 1930 is coupled to one or more antennas 1920. The transceiver 1930 enables communicating with various other apparatus over a transmission medium. The processing system 1914 includes a processor 1922 coupled to a computer-readable medium 1926. The processor 1922 is responsible for general processing, including the execution of software stored on the computer-readable medium 1926. The software, when executed by the processor 1922, causes the processing system 1914 to perform the various functions described for any particular apparatus. The computer-readable medium 1926 may also be used for storing data that is manipulated by the processor 1922 when executing software.

The processing system 1914 includes a identifying module 1902 for identifying a first virtual cell identity. The processing system 1914 also includes a determining module 1904 for determining one or more virtual cells. The processing system 1914 may further include a processing module 1906 for processing one or more channels. The modules may be software modules running in the processor 1922, resident/stored in the computer-readable medium 1926, one or more hardware modules coupled to the processor 1922, or some combination thereof. The processing system 1914 may be a component of the UE 650.

Figure 20:
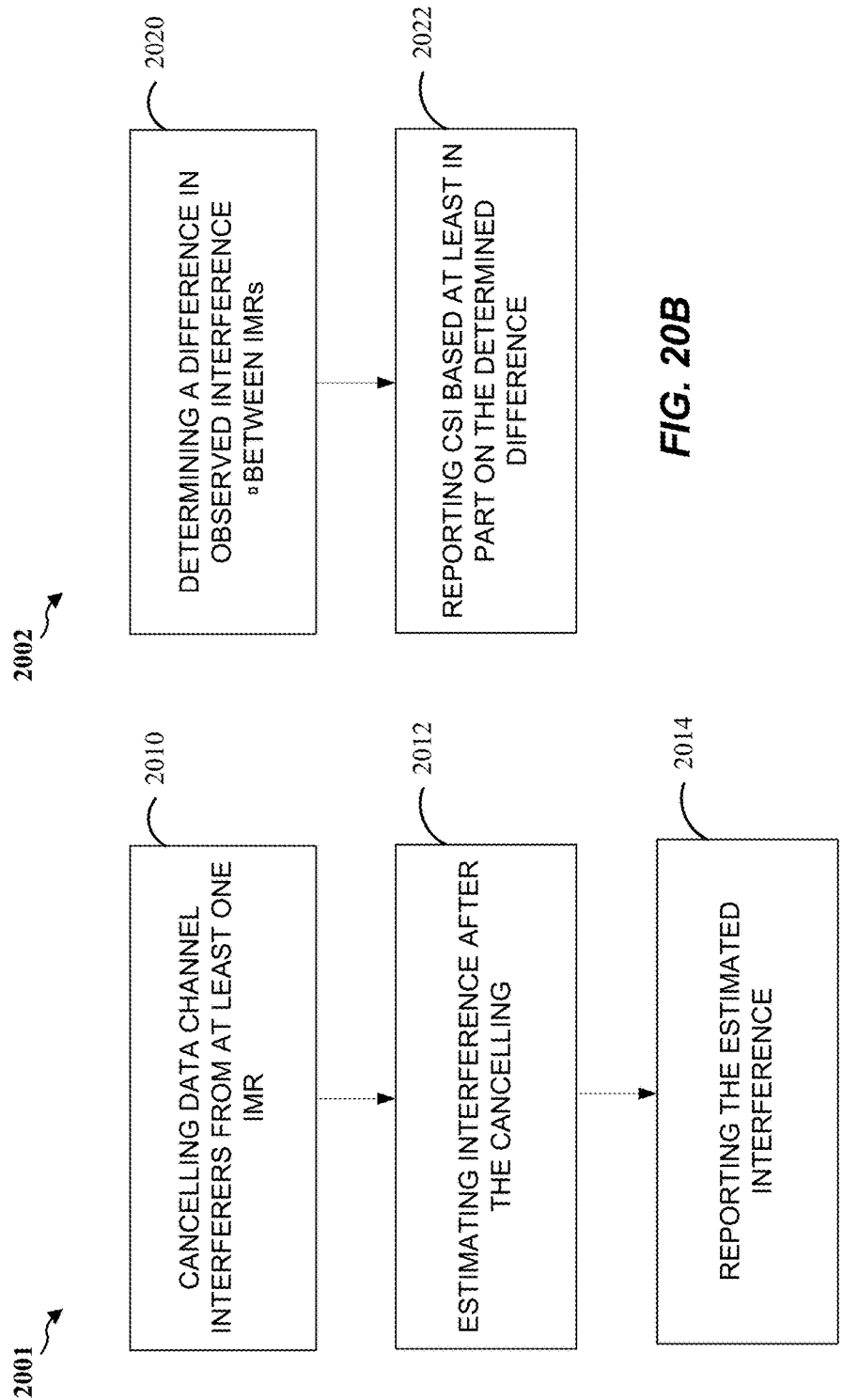
FIGS. 20A and 20B are flow diagrams illustrating exemplary processes according to aspects of the present disclosure.

FIG. 20A illustrates a method 2001 for wireless communication. In block 2010, the data channel interferers from one or more interference measurement resources (IMRs) are cancelled. In block 2012, after the cancelling, the interference is estimated. Next, in block 2014, the estimated interference is reported.

FIG. 20B illustrates a method 2002 for wireless communication. In block 2020, a difference in observed interference between multiple interference measurement resources (IMRs) is determined. In block 2022, the channel state information (CSI) based on the determined difference is reported.

In one configuration, the UE 650 is configured for wireless communication including means for canceling. In one aspect of the present disclosure, the canceling means is the controller/processor 659, receive processor 656, and/or memory 660 configured to perform the functions recited by the canceling means. The UE 650 is also configured to include a means for estimating. In one aspect of the present disclosure, the estimating means is the controller/processor 659, receive processor 656 and/or memory 660 configured to perform the functions recited by the estimating means. The UE 650 is also configured to include a means for reporting. In one aspect of the present disclosure, the reporting means is the controller/processor 659, antennas 652, transmit processor 668, and/or memory 660 configured to perform the functions recited by the reporting means. In another aspect of the present disclosure, the aforementioned means are any module or any apparatus configured to perform the functions recited by the aforementioned means.

Figure 21:
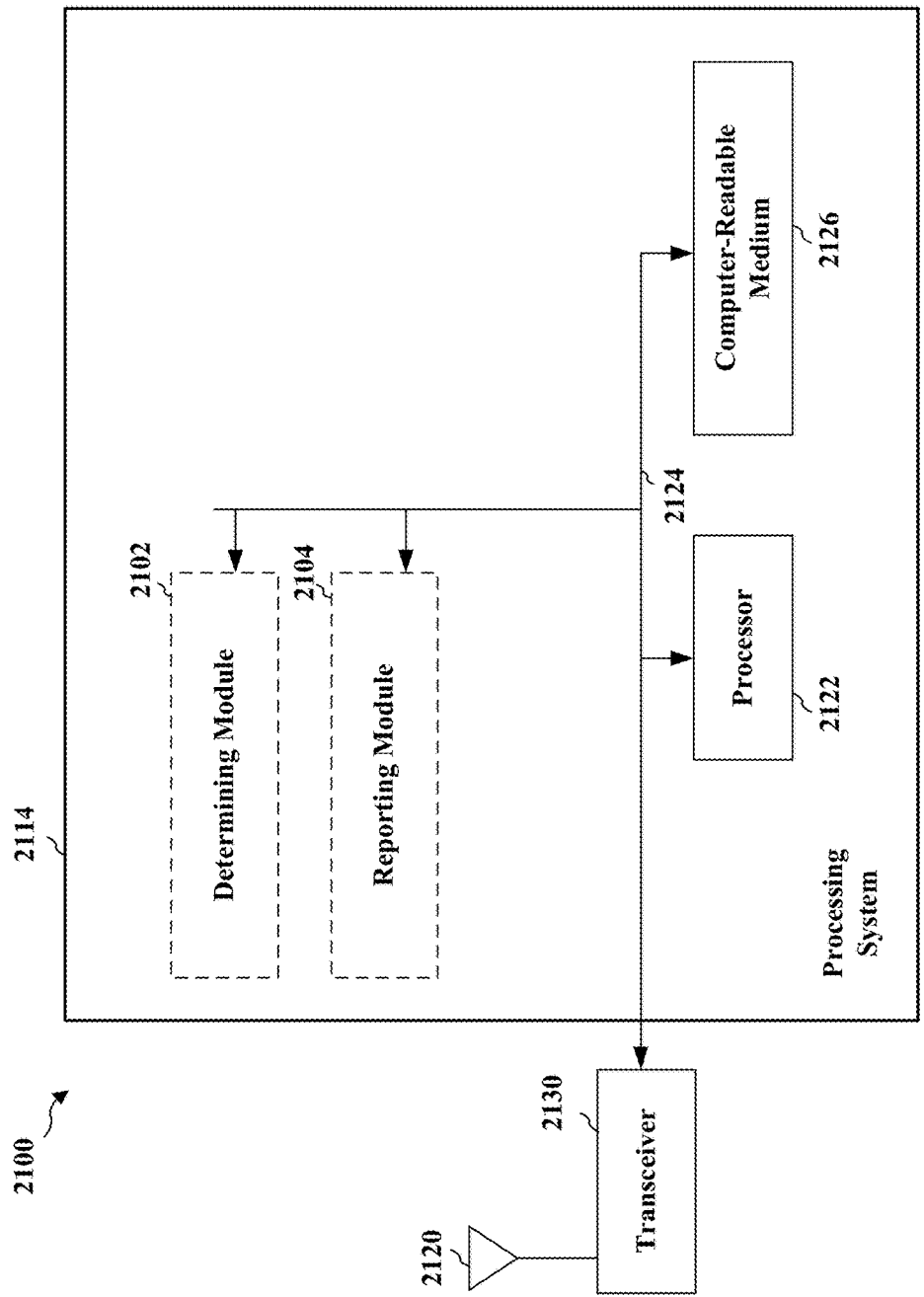
FIGS. 21 and 22 are block diagrams illustrating different modules/means/components in an exemplary apparatus.

FIG. 21 is a diagram illustrating an example of a hardware implementation for an apparatus 2100 employing a processing system 2114. The processing system 2114 may be implemented with a bus architecture, represented generally by the bus 2124. The bus 2124 may include any number of interconnecting buses and bridges depending on the specific application of the processing system 2114 and the overall design constraints. The bus 2124 links together various circuits including one or more processors and/or hardware modules, represented by the processor 2122 the modules 2102, 2104 and the computer-readable medium 2126. The bus 2124 may also link various other circuits such as timing sources, peripherals, voltage regulators, and power management circuits, which are well known in the art, and therefore, will not be described any further.

The apparatus includes a processing system 2114 coupled to a transceiver 2130. The transceiver 2130 is coupled to one or more antennas 2120. The transceiver 2130 enables communicating with various other apparatus over a transmission medium. The processing system 2114 includes a processor 2122 coupled to a computer-readable medium 2126. The processor 2122 is responsible for general processing, including the execution of software stored on the computer-readable medium 2126. The software, when executed by the processor 2122, causes the processing system 2114 to perform the various functions described for any particular apparatus. The computer-readable medium 2126 may also be used for storing data that is manipulated by the processor 2122 when executing software.

The processing system 2114 includes a determining module 2102 for determining a difference in observed interference between two or more interference measurement resources. The processing system 2114 may further include a reporting module 2104 for reporting channel state information based on the determined difference. The modules may be software modules running in the processor 2122, resident/stored in the computer-readable medium 2126, one or more hardware modules coupled to the processor 2122, or some combination thereof. The processing system 2114 may be a component of the UE 650.

In one configuration, the UE 650 is configured for wireless communication including means for determining. In one aspect of the present disclosure, the determining means is the controller/processor 659, memory 660, receive processor 656, and/or determining module 2102 configured to perform the functions recited by the determining means. The UE 650 is also configured to include a means for reporting. In one aspect of the present disclosure, the reporting means is the controller/processor 659, memory 660, antennas 652, transmit processor 668, and/or reporting module 2104 configured to perform the functions recited by the reporting means. In another aspect of the present disclosure, the aforementioned means are any module or any apparatus configured to perform the functions recited by the aforementioned means.

Figure 22:
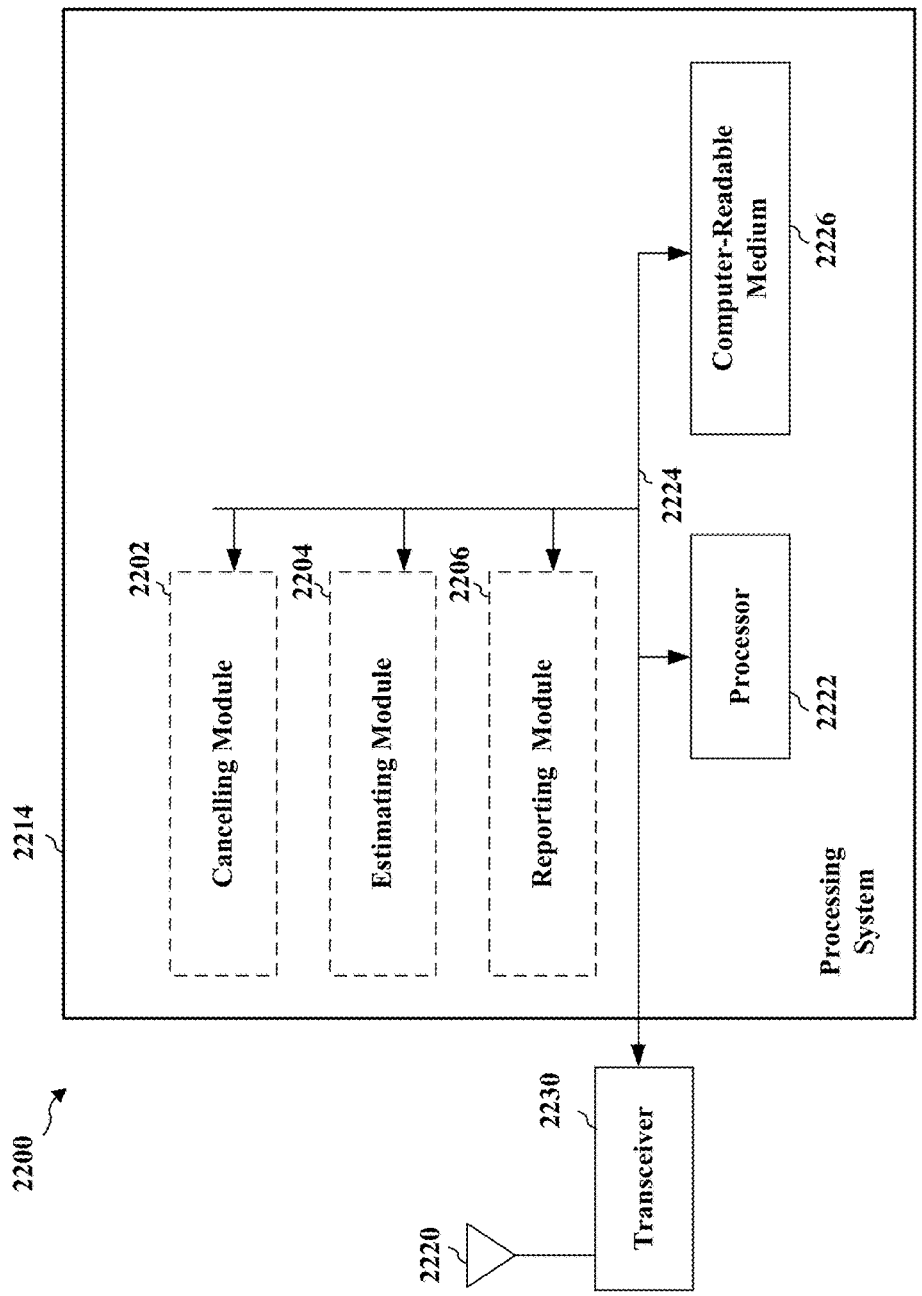

FIG. 22 is a diagram illustrating an example of a hardware implementation for an apparatus 2200 employing a processing system 2214. The processing system 2214 may be implemented with a bus architecture, represented generally by the bus 2224. The bus 2224 may include any number of interconnecting buses and bridges depending on the specific application of the processing system 2214 and the overall design constraints. The bus 2224 links together various circuits including one or more processors and/or hardware modules, represented by the processor 2222 the modules 2202, 2204, 2206 and the computer-readable medium 2226. The bus 2224 may also link various other circuits such as timing sources, peripherals, voltage regulators, and power management circuits, which are well known in the art, and therefore, will not be described any further.

The apparatus includes a processing system 2214 coupled to a transceiver 2230. The transceiver 2230 is coupled to one or more antennas 2220. The transceiver 2230 enables communicating with various other apparatus over a transmission medium. The processing system 2214 includes a processor 2222 coupled to a computer-readable medium 2226. The processor 2222 is responsible for general processing, including the execution of software stored on the computer-readable medium 2226. The software, when executed by the processor 2222, causes the processing system 2214 to perform the various functions described for any particular apparatus. The computer-readable medium 2226 may also be used for storing data that is manipulated by the processor 2222 when executing software.

The processing system 2214 includes a canceling module 2202 for cancelling data channel interferers from one or more interference measurement resource. The processing system 2214 also includes a estimating module 2204 for estimating interference after cancelling the data channel interferes. The processing system 2214 may further include a reporting module 2206 for reporting the estimated interference. The modules may be software modules running in the processor 2222, resident/stored in the computer-readable medium 2226, one or more hardware modules coupled to the processor 2222, or some combination thereof. The processing system 2214 may be a component of the UE 650.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communications, comprising:
   receiving, at a user equipment (UE), shared channel rate matching and quasi co-location indication (PQI) bits;
   identifying, at the UE, a set of parameters from the PQI bits, the set of parameters comprising at least one of a cell identity, a number of ports for cell-specific reference signals (CRS), a frequency shift of CRS, a modulation order for a channel, a channel state information reference signal (CSI-RS) configuration, or a combination thereof;
   identifying, at the UE, a first virtual cell identity (VCI) associated with the set of parameters;
   determining, at the UE, at least one first virtual cell based at least in part on the identified first VCI; and performing, at the UE, interference cancellation or interference suppression on at least one interfering channel of the at least one first virtual cell, the at least one interfering channel identified at the UE based at least in part on the set of parameters.

2. The method of claim 1, further comprising receiving the set of parameters for a rate matching operation, a quasi-co-location for coordinated multipoint (CoMP) operation, or a combination thereof.

3. The method of claim 2, in which the rate matching operation and the quasi-co-location for CoMP operation are for at least a physical downlink shared channel (PDSCH), an enhanced physical downlink control channel (EPDCCH), or a combination thereof.

4. The method of claim 1, in which the interference cancellation or interference suppression is performed for at least inter-cell interference, intra-cell interference due to single-user multiple-input multiple-output (SU-MIMO) operation, intra-cell interference due to multi-user MIMO (MU-MIMO) operation, or a combination thereof.

5. The method of claim 1, further comprising identifying a second VCI that is different from the first VCI, in which at least one second virtual cell is determined based at least in part on the identified second VCI.

6. The method of claim 5, in which the at least one second virtual cell is different from the at least one first virtual cell associated with the first VCI, and a difference between the at least one second virtual cell and the at least one first virtual cell comprises at least a number of virtual cells, the set of parameters associated with the at least one first virtual cell, or a combination thereof.

7. The method of claim 5, in which the first VCI and the second VCI are identified in a same frame.

8. The method of claim 5, in which the first VCI is identified in a first subframe and the second VCI is identified in a second subframe that is different from the first subframe.

9. The method of claim 1, in which the at least one interfering channel is a data channel or a control channel.

10. The method of claim 1, further comprising determining a timing for the interference cancellation or the interference suppression based at least in part on the set of parameters.

11. A user equipment (UE) for wireless communication, comprising:
a memory; and
at least one processor coupled to the memory, the at least one processor being configured:
to receive shared channel rate matching and quasi co-location indication (PQI) bits;
to identify a set of parameters from the PQI bits, the set of parameters comprising at least one of a cell identity, a number of ports for cell-specific reference signals (CRS), a frequency shift of CRS, a modulation order for a channel, a channel state information reference signal (CSI-RS) configuration, or a combination thereof;
to identify a first virtual cell identity (VCI) associated with the set of parameters;
to determine at least one first virtual cell based at least in part on the identified first VCI; and
to perform interference cancellation or interference suppression on at least one interfering channel of the at least one first virtual cell, the at least one interfering channel identified at the UE based at least in part on the set of parameters.

12. The UE of claim 11, in which the at least one processor is further configured to receive the set of parameters for a rate matching operation, a quasi-co-location for coordinated multipoint (CoMP) operation, or a combination thereof.

13. The UE of claim 12, in which the rate matching operation and the quasi-co-location for CoMP operation are for at least a physical downlink shared channel (PDSCH), an enhanced physical downlink control channel (EPDCCH), or a combination thereof.

14. The UE of claim 11, in which the interference cancellation or interference suppression is performed for at least inter-cell interference, intra-cell interference due to single-user multiple-input multiple-output (SU-MIMO) operation, intra-cell interference due to multi-user MIMO (MU-MIMO) operation, or a combination thereof.

15. The UE of claim 11, in which the at least one processor is further configured to identify a second VCI that is different from the first VCI, in which at least one second virtual cell is determined based at least in part on the identified second VCI.

16. The UE of claim 15, in which the at least one second virtual cell is different from the at least one first virtual cell associated with the first VCI, and a difference between the at least one second virtual cell and the at least one first virtual cell comprises at least a number of virtual cells, the set of parameters associated with the at least one first virtual cell, or a combination thereof.

17. The UE of claim 15, in which the first VCI and the second VCI are identified in a same frame.

18. The UE of claim 15, in which the first VCI is identified in a first subframe and the second VCI is identified in a second subframe that is different from the first subframe.

19. The UE of claim 11, in which the at least one interfering channel is a data channel or a control channel.

20. The UE of claim 11, in which the at least one processor is further configured to determine a timing for the interference cancellation or the interference suppression based at least in part on the set of parameters.

* * * * *